US011586829B2

(12) United States Patent
Mishra et al.

(10) Patent No.: US 11,586,829 B2
(45) Date of Patent: Feb. 21, 2023

(54) NATURAL LANGUAGE TEXT GENERATION FROM A SET OF KEYWORDS USING MACHINE LEARNING AND TEMPLATES

(71) Applicant: International Business Machines Corporation, Armonk, NY (US)

(72) Inventors: Abhijit Mishra, Bangalore (IN); Md Faisal Mahbub Chowdhury, Woodside, NY (US); Sagar Manohar, White Plains, NY (US); Dan Gutfreund, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 16/864,253

(22) Filed: May 1, 2020

(65) Prior Publication Data
US 2021/0342552 A1 Nov. 4, 2021

(51) Int. Cl.
*G06F 40/00* (2020.01)
*G06N 20/00* (2019.01)
*G06F 40/40* (2020.01)

(52) U.S. Cl.
CPC ............. *G06F 40/40* (2020.01); *G06N 20/00* (2019.01)

(58) Field of Classification Search
CPC ........ G06F 40/40; G06F 40/186; G06F 40/30; G06F 40/56; G06N 20/001; G06N 3/0445;

(Continued)

(56) References Cited

U.S. PATENT DOCUMENTS 6,289,304 B1 9/2001 Grefenstette
6,658,377 B1 12/2003 Anward et al.
(Continued)

FOREIGN PATENT DOCUMENTS

CN 108073576 A * 5/2018

OTHER PUBLICATIONS

Brownlee. (Oct. 21, 2019). A Gentle Introduction to Cross-Entropy for Machine Learning. Machinelearningmastery.com. Retrieved Apr. 25, 2022, from https://machinelearningmastery.com/cross-entropy-for-machine-learning/ (Year: 2019).*

(Continued)

*Primary Examiner* — Huyen X Vo
*Assistant Examiner* — Philip H Lam
(74) *Attorney, Agent, or Firm* — Edell, Shapiro & Finnan, LL

(57) ABSTRACT

An embodiment of the present invention generates natural language content from a set of keywords in accordance with a template. Keyword vectors representing a context for the keywords are generated. The keywords are associated with language tags, while the template includes a series of language tags indicating an arrangement for the generated natural language content. Template vectors are generated from the series of language tags of the template and represent a context for the template. Contributions from the contexts for the keywords and the template are determined based on a comparison of the series of language tags of the template with the associated language tags of the keywords. One or more words for each language tag of the template are generated to produce the natural language content based on combined contributions from the contexts for the keywords and the template.

20 Claims, 9 Drawing Sheets

(58) Field of Classification Search
CPC ...... G06N 3/0454; G06N 3/0472; G06N 3/08; G06N 20/00
See application file for complete search history.

(56) References Cited

U.S. PATENT DOCUMENTS

| | | | | |
|---|---|---|---|---|
| 10,467,274 | B1* | 11/2019 | Ren | G06N 3/0454 |
| 2011/0184727 | A1 | 7/2011 | Connor | |
| 2018/0329883 | A1* | 11/2018 | Leidner | G06F 40/247 |
| 2019/0027133 | A1* | 1/2019 | Georges | G10L 15/1815 |
| 2019/0370396 | A1* | 12/2019 | Agnihotram | G06F 16/353 |

OTHER PUBLICATIONS

Agarwal, V. Aggarwal, A. R. Akula, G. B. Dasgupta and G. Sridhara, "Automatic problem extraction and analysis from unstructured text in IT tickets," in IBM Journal of Research and Development, vol. 61, No. 1, pp. 4:41-4:52, Jan. 1-Feb. 2017, doi: 10.1147/JRD.2016.2629318. (Year: 2017).*

(Diab, M. (Apr. 2009). Second generation AMIRA tools for Arabic processing: Fast and robust tokenization, POS tagging, and base phrase chunking. In 2nd International Conference on Arabic Language Resources and Tools (vol. 110, p. 198).) (Year: 2009).*

K. Uchimoto, et al., "Text Generation from Keywords", COLING '02: Proceedings of the 19th international conference on Computational linguistics—vol. 1, Aug. 2002, https://doi.org/10.3115/1072228.1072292, 7 pages.

Z. Song, et al., "A Neural Network Model for Chinese Sentence Generation with Key Word", 2019 IEEE 9th International Conference on Electronics Information and Emergency Communication (ICEIEC), Jul. 12-14, 2019, Beijing, China, 4 pages.

J. Kabbara, et al., "Stylistic Transfer in Natural Language Generation Systems Using Recurrent Neural Networks", Proceedings of EMNLP 2016 Workshop on Uphill Battles in Language Processing: Scaling Early Achievements to Robust Methods, pp. 43-47, Austin, TX, Nov. 5, 2016, 5 p.

H. Jhamtani, et al., "Shakespearizing Modern Language Using Copy-Enriched Sequence-to-Sequence Models", arXiv.1707.01161v2 [cs.CL], Jul. 20, 2017, 10 pages.

J. Ficler, et al., "Controlling Linguistic Style Aspects in Neural Language Generation", arXiv.1707.02633v1 [cs.CL], Jul. 9, 2017, 14 pages.

S. Ghosh, et al., "Affect-LM: A Neural Language Model for Customizable Affective Text Generation", arXiv:1704.06851v1 [cs.CL], Apr. 22, 2017, 9 pages.

M. Iyyer, et al., "Adversarial Example Generation with Syntactically Controlled Paraphrase Networks", arXiv:1804.06059v1 [cs.CL], Apr. 17, 2018, 11 pages.

M. Chen, et al., "Controllable Paraphrase Generation with a Syntactic Exemplar", arXiv:1906.00565v1 [cs.CL], Jun. 3, 2019, 13 pages.

Wikipedia, "Part-of-speech tagging", https://en.wikipedia.org/wiki/Part-of-speech_tagging, downloaded from the internet on Apr. 20, 2020, 7 pages.

Bird et al., "Categorizing and Tagging Words", Sep. 4, 2019, from Natural Language Processing with Python, https://www.nltk.org/book/ch05.html, 29 pages.

M. Gupta, "NLP | WordNet for tagging", GeeksforGeeks, https://www.geeksforgeeks.org/nlp-wordnet-for-tagging/, downloaded from the internet on Apr. 20, 2020, 5 pages.

Wikipedia, "Function word", https://en.wikipedia.org/wiki/Function_word, downloaded from the internet on Apr. 20, 2020, 3 pages.

X. Schmaltz, et al., "Word OrderingWithout Syntax", Proceedings of the 2016 Conference on Empirical Methods in Natural Language Processing, pp. 2319-2324, Austin, Texas, Nov. 1-5, 2016, https://www.aclweb.org/anthology/D16-1255.pdf, 6 pages.

Wikipedia, "F1 score", https://en.wikipedia.org/wiki/F1_score, downloaded from the internet on Apr. 20, 2020, 3 pages.

W. Wang, et al., "Toward unsupervised text content manipulation", arXiv:1901.09501v2 [cs.CL], Feb. 8, 2019, 12 pages.

A. Laha, et al., "Scalable Micro-planned Generation of Discourse from Structured Data", Computational Linguistics, vol. 45, No. 4, 2019, 28 pages.

D. Bahdanau, et al., "Neural Machine Translation by Jointly Learning to Align and Translate", Published as a conference paper at ICLR 2015, arXiv:1409.0473v7 [cs.CL], May 19, 2016, 15 pages.

S. Banerjee, et al., "METEOR: An Automatic Metric for MT Evaluation with Improved Correlation with Human Judgments", Proceedings of the ACL Workshop on Intrinsic and Extrinsic Evaluation Measures for Machine Translatior and/or Summarization, pp. 65-72, Ann Arbor, Jun. 2005, 8 pages.

J. Chung, et al., "Empirical Evaluation of Gated Recurrent Neural Networks on Sequence Modeling", arXiv:1412.3555v1 [cs.NE], Dec. 11, 2014, 9 pages.

Z. Hu, et al., "Toward Controlled Generation of Text", Proceedings of the 34 th International Conference on Machine Learning, Sydney, Australia, PMLR 70, 2017, 10 pages.

X. Zhang, et al., "Chinese Poetry Generation with Recurrent Neural Networks", Proceedings of the 2014 Conference on Empirical Methods in Natural Language Processing (EMNLP), pp. 670-680, Oct. 25-29, 2014, Doha, Qatar, 11 pages.

G. Klein, et al., "OpenNMT: Open-Source Toolkit for Neural Machine Translation", arXiv:1701.02810v2 [cs.CL], Mar. 6, 2017, 6 pages.

L. Yu, et al., "SeqGAN: Sequence Generative Adversarial Nets with Policy Gradient", Proceedings of the Thirty-First AAAI Conference on Artificial Intelligence (AAAI-17), Feb. 4-9, 2017, San Francisco, CA, 7 pages.

Z. Li, et al., "Paraphrase Generation with Deep Reinforcement Learning", arXiv:1711.00279v3 [cs.CL], Aug. 23, 2018, 14 pages.

Chin-Yew Lin, "ROUGE: A Package for Automatic Evaluation of Summaries", https://www.aclweb.org/anthology/W04-1013/, 2004, 8 pages.

A. Mishra, et al., "A Modular Architecture for Unsupervised Sarcasm Generation", Proceedings of the 2019 Conference on Empirical Methods in Natural Language Processing and the 9th International Joint Conference on Natural Language Processing, pp. 6144-6154, Hong Kong, China, Nov. 3-7, 2019, 11 pages.

K. Papineni, et al., "BLEU: a Method for Automatic Evaluation of Machine Translation", Proceedings of the 40th Annual Meeting of the Association for Computational Linguistics (ACL), Philadelphia, Jul. 2002, 8 pages.

E. Reiter, et al., "Building Natural Language Generation Systems", Computational Linguistics, vol. 27, No. 2, Cambridge University Press (Studies in natural language processing), 2000, xxi+248 pp; hardbound, ISBN 0-521-62036-8, 3 pages.

S. Surya, et al., "Unsupervised Neural Text Simplification", arXiv:1810.07931v6 [cs.CL], Aug. 21, 2019, 11 pages.

A. Vaswani, et al., "Attention Is All You Need", 31st Conference on Neural Information Processing Systems (NIPS 2017), Long Beach, CA, USA, Dec. 4-9, 2017, 11 pages.

O. Vinyals, et al., "Show and Tell: A Neural Image Caption Generator", https://www.cv-foundation.org/openaccess/content_cvpr_2015/html/Vinyals_Show_and_Tell_2015_CVPR_paper.html, The IEEE Conference on Computer Vision and Pattern Recognition (CVPR), 2015, 9 pages.

S. Wiseman, et al., "Challenges in Data-to-Document Generation", arXiv:1707.8052v1 [cs.CL], Jul. 25, 2017, 13 pages.

J. Wieting, et al., "PARANMT-50M: Pushing the Limits of Paraphrastic Sentence Embeddings with Millions of Machine Translations", arXiv:1711.05732v2 [cs.CL], Apr. 20, 2018, 15 pages.

Z. Hu, et al., "Controllable Text Generation", arXiv:1703.00955v1 [cs.LG], Mar. 2, 2017, 10 pages.

Kolokas, Nikolaos, et al., "Keywords-To-Text Synthesis Using Recurrent Neural Network," IFIP International Conference on Artificial Intelligence Applications and Innovations, pp. 85-96, Springer, Cham, 2018, 12 pages.

* cited by examiner

| SENTENCES WITHOUT STOP WORDS | SENTENCES |
|---|---|
| i'm sorry | i'm sorry . |
| idea term | he had no idea about such terms . |
| feature american nature | it's a feature of american nature . |
| comical morning | there was something comical in the morning ... |

_705_

| POS TAGS (NO STOP WORDS) | POS TAGS (SENTENCES) |
|---|---|
| VB NN JJ | PR VB NN JJ . |
| NN NN | PR VB DT NN IN JJ NN . |
| NN JJ NN | PR VB DT NN IN JJ NN . |
| JJ NN | EX VB NN JJ IN DT NN . |

_710_

POS TAG KEY
DT - SINGULAR DETERMINER/QUANTIFIER (THIS, THAT)
EX - EXISTENTIAL THERE
IN - PREPOSITION
JJ - ADJECTIVE
NN - SINGULAR OR MASS NOUN
PR - PRONOUN
VB - VERB, BASE FORM

FIG.7

| Model | BLEU (%) | | METEOR (%) | | ROUGE-L (%) | | SkipT | | POSMatch (%) | |
|---|---|---|---|---|---|---|---|---|---|---|
| | Exact | Similar | Exact | Similar | Exact | Similar | Exact | Similar | Exact | Similar |
| TRANSNOTEMPLATE | 6.08 | N/A | 18.74 | N/A | 30.7 | N/A | 0.72 | N/A | 14.9 | N/A |
| RNNNOTEMPLATE | 16.51 | N/A | 27.13 | N/A | 48.17 | N/A | 0.76 | N/A | 22.44 | N/A |
| TRANSCONCAT | 55.1 | 8.75 | 45.4 | 21.13 | 78.44 | 41.1 | 0.91 | 0.78 | 92.77 | 84.7 |
| RNNCONCAT | 52.62 | 8.33 | 44.5 | 20.81 | 77.22 | 40.7 | 0.91 | 0.78 | 92.95 | 80.0 |
| SENTEXEMP | 36.64 | 2.47 | 29.38 | 12.39 | 65.14 | 30.29 | 0.85 | 0.72 | 67.36 | 53.56 |
| **TEMPLATE | 40.33 | 10.12 | 38.15 | 20.96 | 70.46 | 42.77 | 0.89 | 0.79 | 93.08 | 92.15 |
| **TEMPLATEBEAM | 40.79 | 10.0 | 38.28 | 20.94 | 70.66 | 42.79 | 0.89 | 0.79 | 93.03 | 92.16 |

Results for sentence generation from input keywords on the dataset

| Model | BLEU (%) | | METEOR (%) | | ROUGE-L (%) | | SkipT | | POSMatch (%) | |
|---|---|---|---|---|---|---|---|---|---|---|
| | Exact | Similar | Exact | Similar | Exact | Similar | Exact | Similar | Exact | Similar |
| TRANSNOTEMPLATE | 3.75 | N/A | 20.25 | N/A | 26.42 | N/A | 0.68 | N/A | N/A | N/A |
| RNNNOTEMPLATE | 3.52 | N/A | 20.83 | N/A | 28.12 | N/A | 0.7 | N/A | N/A | N/A |
| TRANSCONCAT | 18.78 | 7.37 | 28.31 | 20 | 52.27 | 38.9 | 0.82 | 0.77 | 87.27 | 83.04 |
| RNNCONCAT | 15.89 | 6.25 | 28.07 | 19.6 | 50.68 | 38.01 | 0.83 | 0.77 | 83.87 | 79.93 |
| SENTEXEMP | 36.64 | 2.47 | 29.38 | 12.39 | 65.14 | 30.29 | 0.85 | 0.72 | 67.36 | 53.56 |
| **TEMPLATE | 40.33 | 10.12 | 38.15 | 20.96 | 70.46 | 42.77 | 0.89 | 0.79 | 93.08 | 92.15 |
| **TEMPLATEBEAM | 40.79 | 10.0 | 38.28 | 20.94 | 70.66 | 42.79 | 0.89 | 0.79 | 93.03 | 92.16 |

Results for sentence generation by reversing input keywords on the dataset

FIG.8

| Keywords | Example Template Sentence | Template POS | Generated Output | Remark |
|---|---|---|---|---|
| <john, job> (NN, NN) | who is bob's friend? | WP VBZ NNP POS NN | SENTEXEMP who is this right<br>RNNCONCAT what's john's job?<br>TRANSCONCAT what's john's job?<br>** TEMPLATEBEAM what's john's job? | question from |
| <john, job> (NN, NN) | why does bob go to the city? | WP VBZ NNP VB IN DT NN | SENTEXEMP why does ten go to the boy<br>RNNCONCAT what does john do for the job?<br>TRANSCONCAT what does john do about the job?<br>** TEMPLATEBEAM what does john do with the job? | paraphrasing with different template |
| <movie, beautiful> (NN, JJ) | this is a horrible story. | DT VBZ DT JJ NN | SENTEXEMP this is a horrible...<br>RNNCONCAT this is a movie beautiful<br>TRANSCONCAT this is a whole movie<br>** TEMPLATEBEAM this is a beautiful movie | declarative form |
| <movie, beautiful> (NN, JJ) | what a horrible story it is! | WP DT JJ NN PRP VBZ | SENTEXEMP what a movie show this...<br>RNNCONCAT what a whole movie it <unk><br>TRANSCONCAT what a whole movie it is<br>** TEMPLATEBEAM what a beautiful movie it is | exclamatory form |
| <movie, beautiful> (NN, JJ) | is it a horrible story? | VBZ PRP DT JJ NN | SENTEXEMP is it a horrible...<br>RNNCONCAT is it a movie beautiful?<br>TRANSCONCAT is it a whole movie?<br>** TEMPLATEBEAM is it a beautiful movie? | interrogative form |
| <movie, beautiful> (NN, JJ) | that is not a good book. | DT VBZ RB DT JJ NN | SENTEXEMP that is not a beautiful...<br>RNNCONCAT this isn't a movie beautiful<br>TRANSCONCAT this isn't a whole movie<br>** TEMPLATEBEAM this isn't a beautiful movie | negation |
| <president, begin, work, great> (NN, VB, JJ) | the boy started crying. | DT NN VBD NN | SENTEXEMP the president president's<br>RNNCONCAT the president began work<br>TRANSCONCAT the president began work<br>** TEMPLATEBEAM the president began work | varying keyword order |
| <begin, work, president, great> (NN, VB, JJ) | the boy started crying. | DT NN VBD NN | SENTEXEMP the president president's<br>RNNCONCAT the begin worked president<br>TRANSCONCAT the begin worked president<br>** TEMPLATEBEAM the president began work | varying keyword order |
| <great, president, work, begin> (NN, VB, JJ) | the boy started crying. | DT NN VBD NN | SENTEXEMP the president president's<br>RNNCONCAT the great president work<br>TRANSCONCAT the great was president<br>** TEMPLATEBEAM the president began work | varying keyword order |
| <begin, work, great, president> (NN, VB, JJ) | the boy started crying. | DT NN VBD NN | SENTEXEMP the president president's<br>RNNCONCAT the begin worked great<br>TRANSCONCAT the begin worked great president<br>** TEMPLATEBEAM the president began work | varying keyword order |

POS TAG KEY
DT - SINGULAR DETERMINER/QUANTIFIER (THIS, THAT)
IN - PREPOSITION
JJ - ADJECTIVE
NN - SINGULAR OR MASS NOUN
NNP - PROPER NOUN, SINGULAR
POS - POSSESSIVE ENDING
PRP - PERSONAL PRONOUN
VB - VERB, BASE FORM
VBD - WERB, PAST TENSE
VBZ - VERB, 3RD PERSON SINGULAR PRESENT
WP - WH- PRONOUN

FIG.9

NATURAL LANGUAGE TEXT GENERATION FROM A SET OF KEYWORDS USING MACHINE LEARNING AND TEMPLATES

BACKGROUND

1. Technical Field

Present invention embodiments relate to natural language generation, and more specifically, to generating natural language content (e.g., sentences, clauses, phrases, etc.) from a set of keywords using machine learning and templates.

2. Discussion of the Related Art

Generating realistic sentences is a challenging task since this requires forming syntactically, well-structured sentences, while capturing complex and plausible semantic structures underlying those sentences. Some previous approaches regarding language generation focus on task-specific applications in supervised settings (e.g., machine translation, image captioning, etc.). Further approaches address generic text generation (e.g., political speech generation, poem generation, etc.), where training samples are obtained from a corresponding task specific corpus. Generation of semantically equivalent literal or sarcastic paraphrased sentences, or even simpler sentences, has also been explored.

However, generating sentences from a few given keywords is a difficult task. An example input for this task is a set of keywords (e.g., "victim", "Vanessa", "demons"), and an acceptable output for the example input is the sentence "Vanessa can also become a victim of demons". This generation is complex since natural plausible sentences cannot be generated by merely reordering a few keywords. Unlike sentences typically provided as input to traditional language generation systems, keywords do not inform the system how to learn semantic, lexical and syntactic aspects to produce a valid text containing those keywords. Also, keywords can come from a structured input (such as tables, data-structures, knowledgebases, etc.) in any order creating additional challenges for the learning system. This is not the case for input sentences in traditional systems, since words in a sentence are grammatically ordered.

Controllable text generation has been explored mainly for the text-to-text domain. Existing approaches for text-to-text controllable text generation only receive input parameters, and generate text by sampling text randomly from language models. However, these approaches are not applicable when input text is given, or the input is in a non-sentential form (e.g., not in the form of a sentence).

Another form of controllable text generation includes rule-based controllable styling. This approach receives input text and style parameters, and requires a domain expert to design rules that transform the input text into user-specified stylized text. Although the rule-based control styling approach is intuitive, this approach is not feasible to scale to various domains, data formats, and template patterns.

Accordingly, existing controllable text generation approaches are special purpose (e.g., style specification specific, etc.), where the design strongly depends on the input parameters. The extension of these approaches to adapt to even a slightest variation (e.g., to add a new tunable parameter) is extremely difficult.

SUMMARY

According to one embodiment of the present invention, a system comprises a processor to generate natural language content from a set of keywords in accordance with a template. Keyword vectors representing a context for the keywords are generated. The keywords are associated with language tags, while the template includes a series of language tags indicating an arrangement for the generated natural language content. Templates can be created from sentences of a large unlabeled text corpus. In other words, any sentence can be used to create a template. Template vectors are generated from the series of language tags of the template and represent a context for the template. Contributions from the contexts for the keywords and the template are determined based on a comparison of the series of language tags of the template with the associated language tags of the keywords. One or more words for each language tag of the template are generated to produce the natural language content based on combined contributions from the contexts for the keywords and the template. Embodiments of the present invention further include a method and computer program product for generating natural language content from a set of keywords and a template in substantially the same manner described above.

The embodiment of the present invention lessens the burden of learning deep syntactic structures in a language due to the template, thereby reducing training time and improving computer performance.

An embodiment of the present invention may further employ language tags of the keywords and templates that include part-of-speech (POS) tags. The part-of-speech (POS) tag sequences of the template provide additional hints about the morphological, lexical and syntactic changes to be made to the keywords and the function words to be additionally used. From a few possible part-of-speech (POS) tags (e.g., NOUNS, VERBS, ADJECTIVES, etc.), numerous POS categories may map to a few candidate words in a vocabulary. This significantly limits the number of choices for a large number of decoding steps, thereby reducing processing for the decoding and enabling a language model of a decoder to have a strong influence on the generation process.

An embodiment of the present invention may also determine a probability for each language tag of the template indicating a likelihood of that language tag of the template matching one of the associated language tags of the keywords. The probability for a corresponding language tag of the template indicates the contribution for the context of the keywords for generating a word for the corresponding language tag of the template, and a complement of the probability indicates the contribution for the context of the template for generating the word for the corresponding language tag of the template. This enables a decoder to shift focus between keyword representations and generic language (e.g., POS, etc.) representations based on the language (e.g., POS, etc.) representations in the template. This helps the decoder decide whether to produce a word related to the input keywords and the morphological form, or to simply introduce a function word (e.g., preposition, etc.) based on the language (e.g., POS, etc.) tags in the template and previously generated words.

An embodiment of the present invention may further determine the associated language tags for the keywords via a machine learning model. The machine learning model is trained with a data set including complete sentences and the complete sentences without function words. This provides a context oblivious approach that improves the accuracy of the tagging, thereby enabling natural language content to be generated that more closely aligns with the keywords and template.

An embodiment of the present invention may also provide language translation, where the keywords are in a first natural language and the generated natural language content is in a second different natural language. The present invention embodiment is indifferent to syntactic order of the keywords or the underlying natural language, thereby enabling flexibility in terms of natural languages processed.

An embodiment of the present invention may further generate the keyword vectors by generating word embeddings for each of the keywords, encoding the word embeddings using a machine learning model to produce encoded vector representations of the keywords, and generating the keyword vectors based on the encoded vector representations. The machine learning model is trained to produce the same encoded vector representations for a set of keywords regardless of an order of the keywords. This enables the natural language content generation to be agnostic of the order of the keywords, thereby generating consistent content from the same keywords (regardless of order) that closely aligns with the template.

An embodiment of the present invention may generate the keyword vectors based on the encoded vector representations by applying attention weights to the encoded vector representations of the keywords to produce a keyword vector for a corresponding language tag of the template as a weighted combination of the encoded vector representations. The attention weights indicate importance of individual keywords and are based on the corresponding language tag of the template. This ensures that the template tags influence the attention mechanism and selection of natural language content, and enables the decoder to provide greater flexibility in extracting contextual information from either the keywords or the template, while ensuring that unnecessary attention is not given to the keywords (unless a current step of generation requires additional attention).

An embodiment of the present invention may still further generate the template vectors by generating word embeddings for each of the language tags of the template, encoding the word embeddings for the language tags of the template using a bidirectional recurrent machine learning model, and producing the template vectors based on the encoded word embeddings for the language tags of the template. Each template vector is produced based on adjacent language tags within the template. This enables the template vectors to more accurately capture the template context since adjacent tags are considered for generating the template vectors.

An embodiment of the present invention may also generate one or more words for each language tag of the template by determining for each language tag of the template a probability distribution over a word vocabulary using a recurrent machine learning model, and selecting one or more words from the word vocabulary for a corresponding language tag of the template based on the probability distribution. The word vocabulary is learned from training data during training of the recurrent machine learning model. This enables function words to be introduced in the generated natural language content from the learned word vocabulary, and produces content that more accurately captures the template since previous words are considered for selecting subsequent words.

BRIEF DESCRIPTION OF THE DRAWINGS

Generally, like reference numerals in the various figures are utilized to designate like components.

FIG. 7 illustrates example training data for tagging keywords with part-of-speech (POS) tags according to an embodiment of the present invention.

FIG. 8 illustrates example metrics for natural language content generation produced from present invention embodiments in comparison with other systems.

FIG. 9 illustrates example natural language content produced from a present invention embodiment in comparison with other systems.

DETAILED DESCRIPTION

Figure 1:
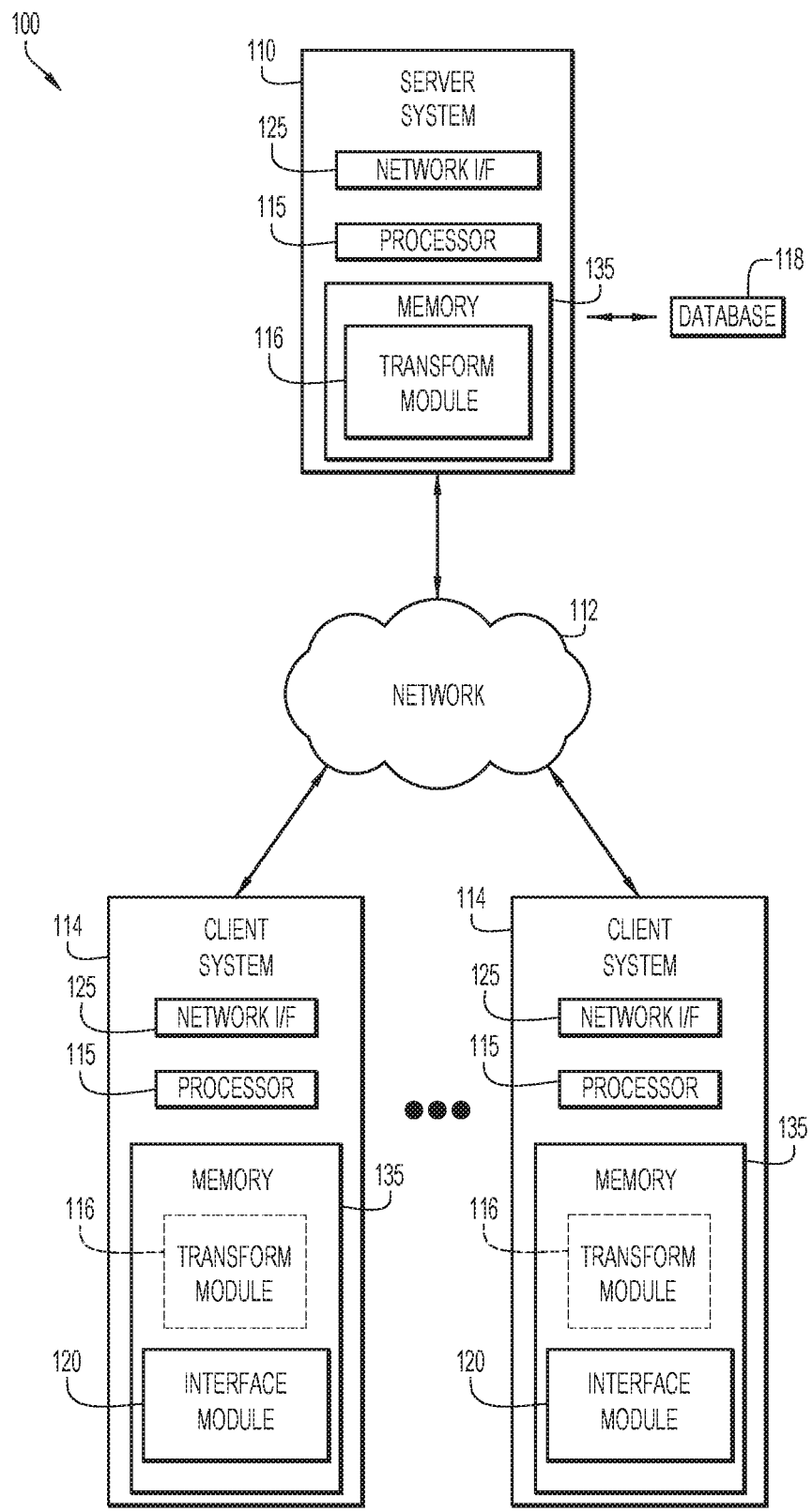
FIG. 1 is a diagrammatic illustration of an example computing environment according to an embodiment of the present invention.

Most natural languages provide numerous manners for constructing sentences that convey the same meaning. However, constructs within a natural language are often repetitive and follow a finite set of syntactic and stylistic variations (e.g., a manner that humans greet each other may be captured through a finite set of predominant greeting styles). Modern language generators, especially neural network models, are over-burdened due to a requirement of meticulously memorizing linguistic syntax and styles apart from performing content selection from input and surface realization (e.g., all in a single episode of learning).

Present invention embodiments guide language generators by using generic structures within a language that are easily available, shallow in nature, and interpretable by humans. This avoids a difficult learning curve of modeling syntax, and enables language generation to be more tractable and accurate.

A data-to-text generator according to an embodiment of the present invention is not concerned about syntax. Rather, the data-to-text generator according to the present invention embodiment focuses on a manner to extract vital content from input keywords and determine an order in which a selected context should appear in the output. The data-to-text generator according to the present invention embodiment logically derives appropriate morphological forms of content words, and intermittently introduces function words as necessary. These processes are made smoother by guiding the data-to-text generator according to the present invention embodiment with a template (e.g., part-of-speech (POS) tag sequence of an example sentence).

Present invention embodiments employ a control specification, in the form of templates, that uses an input-style agnostic approach for which a domain expert is not required.

This control specification, in terms of templates, is dynamic since templates in a natural language (even though finite) may be considerably large in number (e.g., millions, etc.).

A present invention embodiment uses natural language generation (NLG) to summarize data in natural language text, where input may be values in tables, lists of keywords, key-value pairs, knowledge graph entries, etc. The present invention embodiment transforms input text according to an input template. The present invention embodiment does not require explicit supervision (e.g., training data can be automatically generated, etc.), and may utilize easily implementable or available natural language processing (NLP) systems as a source for generating training data. The present invention embodiment may detect part-of-speech (POS) tags of keywords accurately using a context oblivious approach, and may be used to generate a sentence in one language from keywords in another language by using universal POS tags.

An embodiment of the present invention provides for unsupervised template controllable data. Input data are received including a set of keywords and a human interpretable template (e.g., represented by a sequence of part-of-speech (POS) tags). POS tags for the input keywords may be detected using a deep learning-based context oblivious POS tagging approach. Using the input data (e.g., the set of keywords, the detected POS tags, and the template), output summarization text is generated using a deep learning-based natural language generation (NLG) approach. This approach enables output text to be semantically related to the input data, thereby conveying the desired meaning. Further, the output text is transformed according to the template, and knowledge of adhering to the template style may be obtained from easily implementable custom or conventional natural language processing (NLP) systems (e.g., deterministic or machine learning based classifiers), regressors, and/or metrics.

A present invention embodiment considers a set of keywords, a part-of-speech (POS) tag sequence in the form of a template, and may further consider universal POS forms of the keywords. The keywords and template are encoded into vector forms using neural network encoding techniques. A decoder generates a finite number of words according to the POS tags in the template. During generation, the decoder shifts focus between keyword representations and generic POS representations based on the POS representations in the template. This helps the decoder decide whether to produce a word related to the input keywords and the morphological form, or to simply introduce a function word (e.g., preposition, etc.) based on the POS tags in the template and previously generated words.

A present invention embodiment provides a machine learning framework for controllable natural language generation (NLG) from a set of keywords. Realization of keywords in natural language form may be performed in various (but potentially finite) manners according to diverse, lexical, and syntactic structures in a language. The framework accepts an additional input in the form of human-interpretable templates, and generates output that conforms to the template syntax. The template not only lessens the burden of the framework towards learning language structure, but also enables sentence generation to be controllable and tractable. The framework is based on an encode-attend-decode paradigm, where keywords and templates are encoded using linear and recurrent units. A decoder attends over contexts derived from the encoded keywords and templates. Words are produced by either generating morpho-syntactic variations of the keywords (or words related to the keywords), or selecting suitable function words from a vocabulary. The templates include part-of-speech (POS) tag sequences of valid English or other natural language sentences. The framework relies on keywords and templates for training that are easily extracted from a large volume of unlabeled data.

Present invention embodiments provide several advantages. For example, the decoder expects to generate a finite number of words, which should ideally distribute the probability masses over the whole sentence. The burden of learning deep syntactic structures in a language is lessened due to the additional template input. The part-of-speech (POS) tag sequences of templates provide additional hints about the morphological, lexical and syntactic changes to be made to the keywords and the function words to be additionally used. From a few possible part-of-speech POS tags (e.g., NOUNS, VERBS, ADJECTIVES, etc.), numerous POS categories may map to a few candidate words in the vocabulary. This significantly limits the number of choices for a large number of decoding steps, and enables a language model of the decoder to have a strong influence on the generation process.

An example computing environment for use with present invention embodiments is illustrated in FIG. 1. Specifically, computing environment 100 includes one or more server systems 110, and one or more client or end-user systems 114. Server systems 110 and client systems 114 may be remote from each other and communicate over a network 112. The network may be implemented by any number of any suitable communications media (e.g., wide area network (WAN), local area network (LAN), Internet, Intranet, etc.). Alternatively, server systems 110 and client systems 114 may be local to each other, and communicate via any appropriate local communication medium (e.g., local area network (LAN), hardwire, wireless link, Intranet, etc.).

Client systems 114 enable users to submit sets of keywords and templates (and optionally part-of-speech (POS) tags for the keywords) to server systems 110 for generation of natural language content (e.g., sentences, clauses, phrases, etc.). The client systems include an interface module or browser 120 to interact with server systems 110. The server systems include a transform module 116 to generate natural language content (e.g., sentence, clause, phrase, etc.) from a set of keywords and a template provided to the transform module. Transform module 116 may also be provided with part-of-speech (POS) tags for the keywords, or generate the part-of-speech (POS) tags for the keywords based on the provided set of keywords. A database system 118, memory of the client and/or server systems, and/or other storage units may store various information for the analysis (e.g., training data, vocabulary, machine learning or other parameters, dictionaries, etc.). The database system may be implemented by any conventional or other database or storage unit, may be local to or remote from server systems 110 and client systems 114, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from users pertaining to the sets of keywords, corresponding POS tags, and templates, and may provide reports including analysis results (e.g., generated natural language content, metrics pertaining to the analysis, etc.).

Server systems 110 and client systems 114 may be implemented by any conventional or other computer systems (e.g., FIG. 2 as described below) preferably equipped with a display or monitor, a base (e.g., including at least one hardware processor 115 (e.g., microprocessor, controller, central processing unit (CPU), etc.), one or more memories 135 and/or internal or external network interfaces or communications devices 125 (e.g., modem, network cards, etc.)), optional input devices (e.g., a keyboard, mouse or other input device), and any commercially available and custom software (e.g., server/communications software, transform module 116, interface module 120, etc.).

Alternatively, one or more client systems 114 may generate natural language content (e.g., sentence, clause, phrase, etc.) from a set of keywords and a template when operating as a stand-alone unit. In a stand-alone mode of operation, the client system stores or has access to the data (e.g., training data, vocabulary, machine learning or other parameters, dictionaries, etc.), and includes transform module 116 to generate natural language content (e.g., sentence, clause, phrase, etc.) from a set of keywords and a template provided to the transform module. Transform module 116 may also be provided with part-of-speech (POS) tags for the keywords, or generate the part-of-speech (POS) tags for the keywords based on the provided set of keywords. The graphical user (e.g., GUI, etc.) or other interface (e.g., command line prompts, menu screens, etc.) solicits information from a corresponding user pertaining to the desired set of keywords (and optionally the corresponding part-of-speech (POS) tags for the keywords) and template, and may provide reports including the generated natural language content.

Transform and interface modules 116, 120 may include one or more modules or units to perform the various functions of present invention embodiments described below. The various modules (e.g., transform module 116, interface module 120, etc.) may be implemented by any combination of any quantity of software and/or hardware modules or units, and may reside within memory 135 of the server and/or client systems for execution by processor 115.

Figure 2:
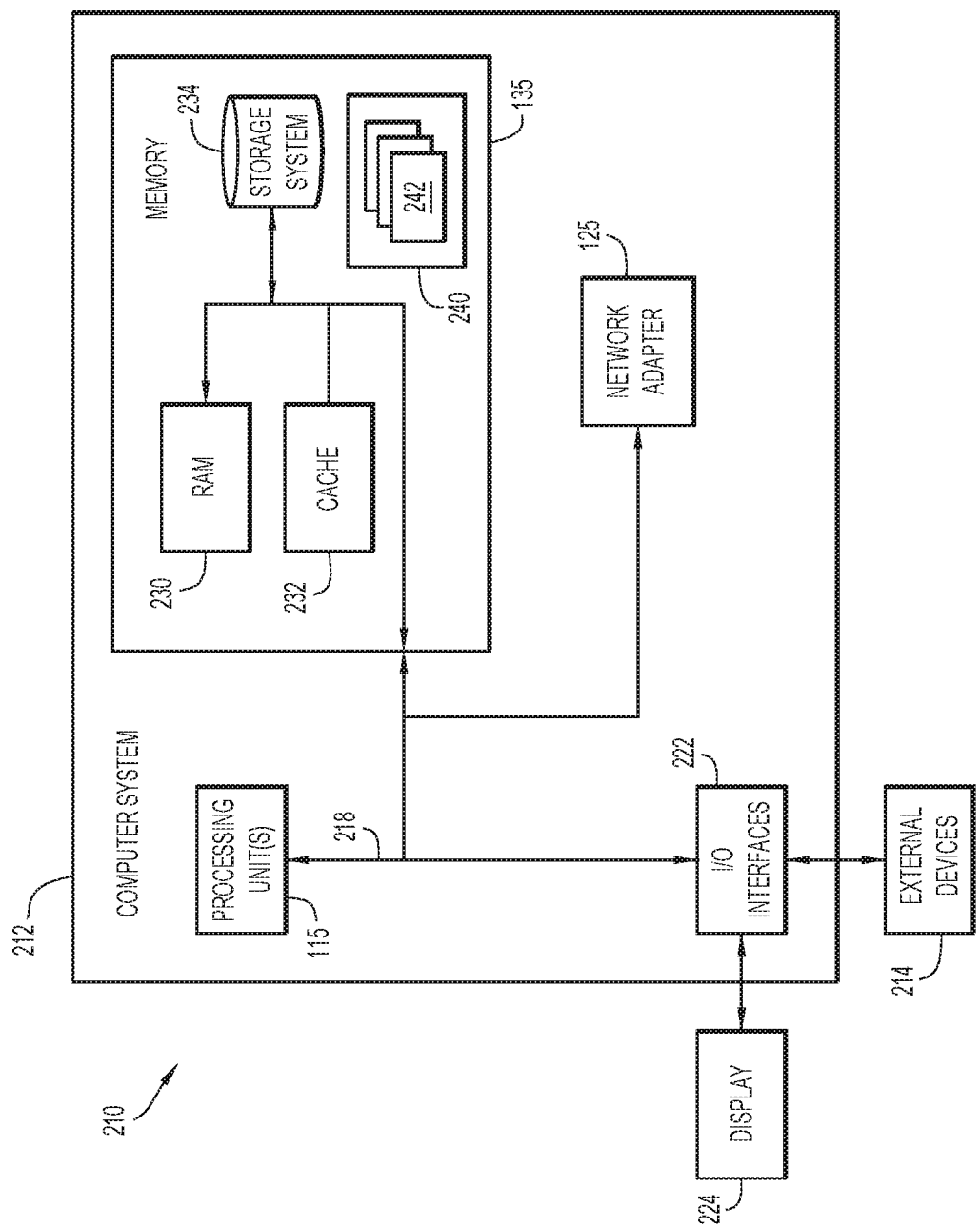
FIG. 2 is a block diagram of an example computing device of the computing environment of FIG. 1 according to an embodiment of the present invention.

Referring now to FIG. 2, a schematic of an example of a computing device 210 of computing environment 100 (e.g., implementing server system 110 and/or client system 114) is shown. The computing device is only one example of a suitable computing device for computing environment 100 and is not intended to suggest any limitation as to the scope of use or functionality of embodiments of the invention described herein. Regardless, computing device 210 is capable of being implemented and/or performing any of the functionality set forth herein.

In computing device 210, there is a computer system 212 which is operational with numerous other general purpose or special purpose computing system environments or configurations. Examples of computing systems, environments, and/or configurations that may be suitable for use with computer system 212 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 212 may be described in the general context of computer system executable instructions, such as program modules, being executed by a computer system. Generally, program modules may include routines, programs, objects, components, logic, data structures, and so on that perform particular tasks or implement particular abstract data types.

As shown in FIG. 2, computer system 212 is shown in the form of a general-purpose computing device. The components of computer system 212 may include, but are not limited to, one or more processors or processing units 115, a system memory 135, and a bus 218 that couples various system components including system memory 135 to processor 115.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 212 typically includes a variety of computer system readable media. Such media may be any available media that is accessible by computer system 212, and includes both volatile and non-volatile media, removable and non-removable media.

System memory 135 can include computer system readable media in the form of volatile memory, such as random access memory (RAM) 230 and/or cache memory 232. Computer system 212 may further include other removable/non-removable, volatile/non-volatile computer system storage media. By way of example only, storage system 234 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 135 may include at least one program product having a set (e.g., at least one) of program modules that are configured to carry out the functions of embodiments of the invention.

Program/utility 240, having a set (at least one) of program modules 242 (e.g., transform module 116, interface module 120, etc.) may be stored in memory 135 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system 212 may also communicate with one or more external devices 214 such as a keyboard, a pointing device, a display 224, etc.; one or more devices that enable a user to interact with computer system 212; and/or any devices (e.g., network card, modem, etc.) that enable computer system 212 to communicate with one or more other computing devices. Such communication can occur via Input/Output (I/O) interfaces 222. Still yet, computer system 212 can communicate with one or more networks such as a local area network (LAN), a general wide area network (WAN), and/or a public network (e.g., the Internet) via network adapter 125. As depicted, network adapter 125 communicates with the other components of computer system 212 via bus 218. It should be understood that although not shown, other hardware and/or software components could be used in conjunction with computer system 212.

Examples, include, but are not limited to: microcode, device drivers, redundant processing units, external disk drive arrays, RAID systems, tape drives, and data archival storage systems, etc.

According to one embodiment of the present invention, a system comprises a processor to generate natural language content from a set of keywords in accordance with a template. Keyword vectors representing a context for the keywords are generated. The keywords are associated with language tags (e.g., part-of-speech (POS) or other tags, etc.), while the template includes a series of language tags (e.g., part-of-speech (POS) or other tags, etc.) indicating an arrangement for the generated natural language content. Template vectors are generated from the series of language tags of the template and represent a context for the template. Contributions from the contexts for the keywords and the template are determined based on a comparison of the series of language tags of the template with the associated language tags of the keywords. One or more words for each language tag of the template are generated to produce the natural language content based on combined contributions from the contexts for the keywords and the template. Embodiments of the present invention further include a method and computer program product for generating natural language content from a set of keywords and a template in substantially the same manner described above.

The embodiment of the present invention lessens the burden of learning deep syntactic structures in a language due to the template, thereby reducing training time and improving computer performance.

An embodiment of the present invention may further employ language tags of the keywords and templates that include part-of-speech (POS) tags. The part-of-speech (POS) tag sequences of the template provide additional hints about the morphological, lexical and syntactic changes to be made to the keywords and the function words to be additionally used. From a few possible part-of-speech POS tags (e.g., NOUNS, VERBS, ADJECTIVES, etc.), numerous POS categories may map to a few candidate words in a vocabulary. This significantly limits the number of choices for a large number of decoding steps, thereby reducing processing for the decoding and enabling a language model of a decoder to have a strong influence on the generation process.

An embodiment of the present invention may also determine a probability for each language tag of the template indicating a likelihood of that language tag of the template matching one of the associated language tags of the keywords. The probability for a corresponding language tag of the template indicates the contribution for the context of the keywords for generating a word for the corresponding language tag of the template, and a complement of the probability indicates the contribution for the context of the template for generating the word for the corresponding language tag of the template. This enables a decoder to shift focus between keyword representations and generic language (e.g., POS, etc.) representations based on the language (e.g., POS, etc.) representations in the template. This helps the decoder decide whether to produce a word related to the input keywords and the morphological form, or to simply introduce a function word (e.g., preposition, etc.) based on the language (e.g., POS, etc.) tags in the template and previously generated words.

An embodiment of the present invention may further determine the associated language tags for the keywords via a machine learning model. The machine learning model is trained with a data set including complete sentences and the complete sentences without function words. This provides a context oblivious approach that improves the accuracy of the tagging, thereby enabling natural language content to be generated that more closely aligns with the keywords and template.

An embodiment of the present invention may also provide language translation, where the keywords are in a first natural language and the generated natural language content is in a second different natural language. The present invention embodiment is indifferent to syntactic order of the keywords or the underlying natural language, thereby enabling flexibility in terms of natural languages processed.

An embodiment of the present invention may further generate the keyword vectors by generating word embeddings for each of the keywords, encoding the word embeddings using a machine learning model to produce encoded vector representations of the keywords, and generating the keyword vectors based on the encoded vector representations. The machine learning model is trained to produce the same encoded vector representations for a set of keywords regardless of an order of the keywords. This enables the natural language content generation to be agnostic of the order of the keywords, thereby generating consistent content from the same keywords (regardless of order) that closely aligns with the template.

An embodiment of the present invention may generate the keyword vectors based on the encoded vector representations by applying attention weights to the encoded vector representations of the keywords to produce a keyword vector for a corresponding language tag of the template as a weighted combination of the encoded vector representations. The attention weights indicate importance of individual keywords and are based on the corresponding language tag of the template. This ensures that the template tags influence the attention mechanism and selection of natural language content, and enables the decoder to provide greater flexibility in extracting contextual information from either the keywords or the template, while ensuring that unnecessary attention is not given to the keywords (unless a current step of generation requires additional attention).

An embodiment of the present invention may still further generate the template vectors by generating word embeddings for each of the language tags of the template, encoding the word embeddings for the language tags of the template using a bidirectional recurrent machine learning model, and producing the template vectors based on the encoded word embeddings for the language tags of the template. Each template vector is produced based on adjacent language tags within the template. This enables the template vectors to more accurately capture the template context since adjacent tags are considered for generating the template vectors.

An embodiment of the present invention may also generate one or more words for each language tag of the template by determining for each language tag of the template a probability distribution over a word vocabulary using a recurrent machine learning model, and selecting one or more words from the word vocabulary for a corresponding language tag of the template based on the probability distribution. The word vocabulary is learned from training data during training of the recurrent machine learning model. This enables function words to be introduced in the generated natural language content from the learned word vocabulary, and produces content that more accurately captures the template since previous words are considered for selecting subsequent words.

Transform module 116 (FIG. 1) according to an embodiment of the present invention receives a set of keywords and a template (and optionally part-of-speech (POS) tags for the keywords), and generates natural language content (e.g., a sentence, clause, phrase, etc.) in accordance with the template. The template includes a sequence of part-of-speech (POS) tags for the resulting generated natural language content. For example, a set of keywords may include (PLAYER1, goals, 15), while a template may include (subject, verb, qualifier, object, complement). Resulting natural language content based on the set of keywords and template includes words corresponding to the part-of-speech (POS) tags in the template. With respect to the example set of keywords and template, resulting natural language content may include "PLAYER1 scored total 15 goals in the tournament." The additional words are selected and inserted based on learning a word vocabulary from training data including example sentences as described below.

Figure 3:
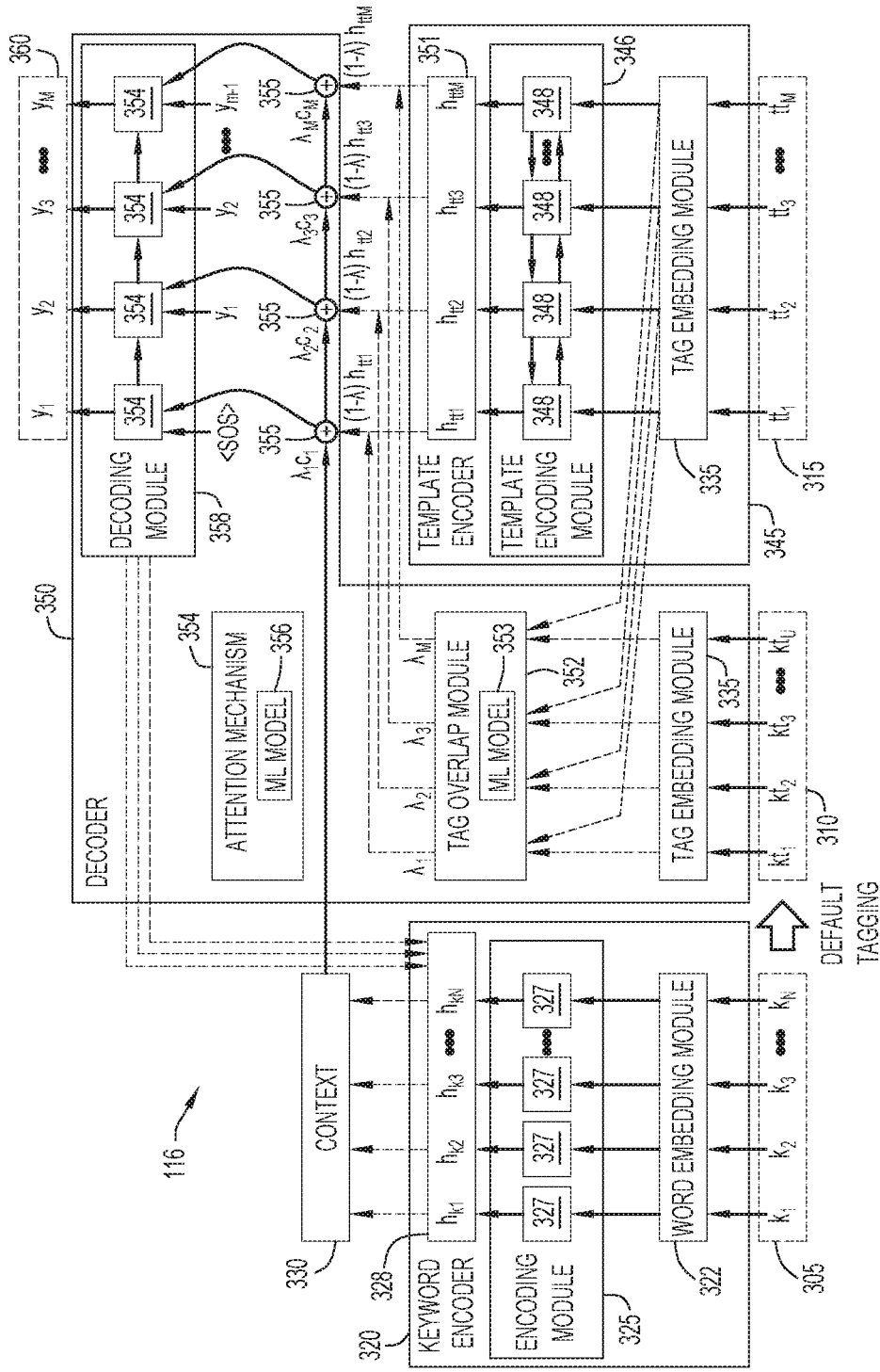
FIG. 3 is a block diagram illustrating a flow of the transform module of FIG. 1 for generating natural language content according to an embodiment of the present invention.

Referring to FIG. 3, transform module 116 according to an embodiment of the present invention processes various data to generate natural language content (e.g., sentences, clauses, phrases, etc.). The data include a set of one or more keywords 305 (e.g., a set of N keywords represented by $K=[k_1, k_2, k_3, \ldots k_N]$ as viewed in FIG. 3), a set of corresponding unique part-of-speech (POS) tags for the keywords 310 (e.g., a set of U POS tags for the keywords represented by $KT=[kt_1, kt_2, kt_3, \ldots kt_U]$ as viewed in FIG. 3), and a sequence of part-of-speech (POS) tags forming a template 315 indicating an arrangement for the generated natural language content (e.g., a sequence of M POS tags for the template represented by $TT=[tt_1, tt_2, tt_3, \ldots tt_M]$ as viewed in FIG. 3). The set of POS tags for the keywords 310 may be provided to transform module 116, or generated by the transform module from the set of keywords 305 using any conventional natural language processing (NLP) techniques and/or tools.

The generated natural language content (e.g., sentence, clause, phrase, etc.) may be represented as a sequence of words 360 (e.g., a sequence of M words represented by $Y=[y1, y2, \ldots yM]$ as viewed in FIG. 3) corresponding to the arrangement indicated by template 315. The variables N, U, and M indicate the length of (or quantity of elements within) set of keywords 305, corresponding part-of-speech (POS) tags 310, template 315, and sequence of words 360, and may be any desired integers of the same or different values. By way of example, transform module 116 of FIG. 3 may be configured to generate a corresponding word for each POS tag in template 315 (e.g., the length of the sequence of words 360 is the same as the length of template 315). However, the length of (or quantity of words in) the generated sequence of words 360 may vary from the length of (or quantity of POS tags in) template 315. In other words, the generated sequence of words 360 may include a fewer or greater quantity of words than the POS tags in the template and/or the keywords in set 305.

Transform module 116 includes a keyword encoder 320, a template encoder 345, and a decoder 350. Keyword encoder 320 generates a transformed or encoded vector for each keyword in the set of keywords 305 (e.g., $K=[k_1, k_2, k_3, \ldots k_N]$ as viewed in FIG. 3) that captures contextual representations of that keyword. The encoding is accomplished in a manner that is agnostic to an order of the keywords in the set. In other words, the resulting transformed vector for a keyword is basically the same regardless of the order of keywords in the set. This may be accomplished by initially passing the keywords through an embedding layer, and non-linearly transforming the embedding of each keyword independently to produce the transformed vectors. The keywords may be provided to the embedding layer as a series of hot-form vectors, where each hot-form vector includes one keyword in a vector position corresponding to the order of the keyword in the set with remaining vector elements set to a zero or null value. Decoder 350 extracts appropriate context from these transformed vectors through an attention mechanism 354 described below.

Keyword encoder 320 generates a transformed or encoded vector for each keyword in the set of keywords 305 (e.g., $K=[k_1, k_2, k_3, \ldots k_N]$ as viewed in FIG. 3) that captures contextual representations, where the encoding is accomplished in a manner that is agnostic to an order of the keywords in the set. Keyword encoder 320 includes a word embedding module 322 and an encoding module 325 to produce the transformed vectors (agnostic to the order of keywords in the set). Word embedding module 322 receives the set of keywords 305 (e.g., $K=[k_1, k_2, k_3, \ldots k_N]$ as viewed in FIG. 3), and generates word embeddings or vector representations for each of the keywords. The keywords may be provided to word embedding module 322 as a series of hot-form vectors as described above.

Basically, each word from the set of keywords may be represented by a vector having numeric elements corresponding to a plurality of dimensions. Words with similar meanings have similar word embeddings or vector representations. The word embeddings are produced from machine learning techniques or models (e.g., neural network, etc.) based on an analysis of word usage in a collection of text or documents. The embeddings or vector representations may be pre-existing, and/or produced using any conventional or other tools or techniques (e.g., GLOVE, WORD2VEC, etc.). Embedding layers (e.g., word embedding module 322 and a tag embedding module 335) may be shared across key encoder 320, template encoder 345, and decoder 350 (e.g., the word embedding and tag embedding modules may be the same, or one module may provide embeddings for words and tags for each of key encoder 320, template encoder 345, and decoder 350).

Encoding module 325 receives the keyword embeddings from word embedding module 322 and produces transformed or encoded vectors 328 (e.g., a set of N transformed vectors represented by $HK=[hk_1, hk_2, hk_3, \ldots hk_N]$ as viewed in FIG. 3). The encoding module employs a machine learning model (e.g., a neural network, etc.) including a stack of feed forward layers 327 for each keyword to transform a corresponding keyword embedding to a transformed vector. Transformed vectors 328 each indicate a contextual representation for a corresponding keyword, and collectively provide a context 330 for the set of keywords 305. The feed forward layers are trained with various sentences (from a collection of text or documents) and orders of keywords to produce the same transformed vector for a keyword regardless of the order of keywords in the set of keywords 305. The transformed vector for a keyword includes various dimensions indicating context representations for the keyword similar to the dimensions of the keyword embeddings.

Template encoder 345 receives the set of part-of-speech (POS) tags for the keywords 310 (e.g., $KT=[kt_1, kt_2, kt_3, kt_U]$ as viewed in FIG. 3) and the sequence of part-of-speech (POS) tags forming template 315 (e.g., $TT=[tt_1, tt_2, tt_3, tt_M]$ as viewed in FIG. 3). The sequence of POS tags of the template indicates an arrangement for the generated natural language content (e.g., sentence, clause, phrase, etc.). Template encoder 345 produces encoded vectors 351 for the template (e.g., set of M encoded template vectors represented by $HTT=[htt_1, htt_2, htt_3, htt_M]$ as viewed in FIG. 3).

The template encoder includes tag embedding module 335 and a template encoding module 346. The tag embedding module (e.g., which may be shared with keyword encoder 320 and decoder 350) receives the set of part-of-speech (POS) tags for the keywords 310 and the sequence of part-of-speech (POS) tags of template 315, and generates tag embeddings or vector representations for each of these tags. Basically, each keyword tag and template tag may be represented by a vector having numeric elements corresponding to a plurality of dimensions. Tags with similar meanings have similar tag embeddings or vector representations. The tag embeddings are produced from machine learning techniques or models (e.g., neural network, etc.) based on an analysis of word and/or tag usage in a collection of text or documents. The tag embeddings or vector representations may be pre-existing, and/or produced using any conventional or other tools or techniques (e.g., GLOVE, WORD2VEC, etc.).

Template encoding module 346 typically employs a machine learning model in the form of a bidirectional recurrent neural network including a layer of bidirectional gated recurrent units (GRUs) 348. The bidirectional recurrent neural network includes a recurrent neural network for each direction (e.g., a forward direction from preceding to succeeding GRUs and a backward direction from succeeding to preceding GRUs). The forward direction recurrent neural network retrieves and processes the template tags (or embeddings) in the order presented (e.g., $tt_1$ through $tt_M$), and generates hidden states for the GRUs in this direction at successive time steps (e.g., each time step corresponds to a GRU 348 processing a corresponding template tag in the presented sequence).

The hidden state for a GRU 348 in the forward direction may be expressed as:

$$s_t \text{ forward} = f(s_{t-1}, ht_{t-1}, ett_t),$$

where f may be an activation function (e.g., tanh, sigmoid, etc.); $s_{t-1}$ is the hidden state of a prior GRU 348 in the forward direction (or the hidden state at a prior time step in the forward direction); $ht_{t-1}$ is an encoded vector for a template tag produced by a prior GRU 348 in the forward direction (or the encoded vector for a template tag produced in the forward direction at a prior time step); and $ett_t$ is an embedding for a template tag at a current time step t in the forward direction.

The backward direction recurrent neural network retrieves and processes the template tags (or embeddings) in the opposing or reverse order (e.g., $tt_M$ through $tt_1$), and generates the hidden states for the GRUs in this direction at successive time steps (e.g., each time step corresponds to a GRU 348 processing a corresponding template tag in the opposing sequence).

The hidden state for a GRU 348 in the backward direction may be expressed as:

$$s_t \text{ backward} = f(s_{t-1}, ht_{t-1}, ett_t),$$

where f may be an activation function (e.g., tanh, sigmoid, etc.); $s_{t-1}$ is the hidden state of a prior GRU 348 in the reverse direction (or the hidden state at a prior time step in the backward direction); $ht_{t-1}$ is an encoded vector for a template tag produced by a prior GRU 348 in the backward direction (or the encoded vector for a template tag produced in the backward direction at a prior time step); and $ett_t$ is an embedding for a template tag at a current time step t in the backward direction.

Once the sequence of template tags is processed for each direction, each GRU 348 (e.g., corresponding to a time step in each direction) concatenates encoded vectors produced by that GRU for each direction and passes the concatenated vector through a non-linear layer of the GRU (e.g., an activation function, such as a tanh operation) that reduces the dimension of the concatenated vector to an appropriate size desired by decoder 350. This enables resulting encoded template vectors 351 to provide information based on preceding and subsequent template tags. In other words, at each time step, a template tag (or embedding) is retrieved and processed by a corresponding GRU 348 in the order for a particular direction. As more template tags (or embeddings) are retrieved and processed, the GRUs processing the succeeding template tags receive and utilize information pertaining to adjacent tags (in the particular direction) to produce the encoded vectors. When the sequences of template tags for each direction are processed, the resulting encoded template vectors provide information based on preceding and subsequent template tags.

For each entry or part-of-speech (POS) tag in template 315, a word is selected from a word vocabulary by decoder 350 to produce the generated natural language content (e.g., sentence, clause, phrase, etc.). However, zero, one, or a plurality of words may be selected from a word vocabulary for a template tag when the length of the sequence of words 360 varies from the length of template 315. The word vocabulary is learned or derived from training data used to train components of transform module 116. The training data for the encoder and decoder portions of transform module 116 (e.g., keyword encoder 320, template encoder 345, decoder 350, etc.) may be generated using a conventional part-of-speech (POS) tagger and unlabeled sentences. The sentences are tagged, where the tagged sequences are retained as training templates and the original sentences are used as references. Words of part-of-speech (POS) categories (e.g., NOUN, VERB, ADJECTIVE, and ADVERB) are lemmatized (e.g., reduced to a base or root form) and used as keywords. For each set of keywords, the POS tagger is independently executed and the unique tags related to all keywords in an example are retained. The words of the example sentences form the word vocabulary from which decoder 350 may select words for generation of the natural language content based on the training.

Decoder 350 includes tag embedding module 335, a tag overlap module 352, an attention mechanism 354, combiners 355, and a decoding module 358. Tag overlap module 352 receives the tag embeddings of the part-of-speech (POS) tags for the keywords and template from tag embedding module 335 (e.g., which may be shared with keyword encoder 320 and template encoder 345), and determines the importance (or context weights) for combining an attended or focused context for the keywords (a context providing attention to or focusing on certain keywords and represented by attended context vectors derived from a weighted combination of the transformed vectors) and the context for the template tags (represented by the encoded template vectors). In each time step of the decoding process (e.g., corresponding to processing a template tag), decoder 350 combines fractions or portions of the attended context for the keywords ascertained from attended context vectors for the keywords derived from a weighted combination of transformed vectors 328 (e.g., HK=[$hk_1$, $hk_2$, $hk_3$, ... $hk_N$] as viewed in FIG. 3) with fractions or portions of the context for the template tags ascertained from encoded template vectors 351 (e.g., HTT=[$htt_1$, $htt_2$, $htt_3$, ... $htt_M$] as viewed in FIG. 3) based on their respective importance or context weight. The importance (or context weights) controls an amount of contribution from (or influence of) the attended context of the keywords and the context of the template tags for selecting words for the resulting natural language content.

The importance or context weight is provided in the form of a probability term (e.g., $\lambda=[\lambda_1, \lambda_2, \lambda_3, \ldots \lambda_M]$ as viewed in FIG. 3) indicating a likelihood of a match between a part-of-speech (POS) tag for a keyword and a template tag, and may be expressed as:

$$s_i = \max_{1 \le j \le L}(\text{cosine\_sim}(ett_i, ekt_j));$$

$$\lambda_i = \text{sigmoid}(W^T_s s_i + b),$$

where $ett_i$ is an embedding for a current template tag, $tt_i$, ascertained from tag embedding module 335; $ekt_j$ is an embedding for a keyword tag, $kt_j$, ascertained from tag embedding module 335; the cosine_sim function is the cosine-similarity function used for vector similarity calculations; $s_i$ is the largest similarity value for a current template tag, $tt_i$, between an embedding, $ett_i$, for current template tag, $tt_i$, and an embedding, $ekt_j$, for a keyword tag, $kt_j$; sigmoid is the sigmoid function; b is a bias; $W^T_s$ are weights; and $\lambda_i$ is the highest matching probability between a current template tag, $tt_i$, and one of the tags related to the keywords. The bias and weights may be determined to provide a desired distribution or curve for the sigmoid function which produces a probability value based on the embeddings for the template tag and a keyword tag having the greatest similarity.

The probability term, $\lambda$, for each template tag indicates the highest probability for a match between that template tag and one of the keyword tags, and typically has a value that resides between 0 and 1 (e.g., or other range indicating between 0% and 100% probability of a match). The tag overlap module may include a machine learning model 353 (e.g., recurrent or other neural network, etc.) to receive the tag embeddings of the part-of-speech (POS) tags for the keywords and template, and generate the probability term according to the above expression. The weights and bias ($W^T_s$ and b) may be determined from training the machine learning model with training sets including various combinations of tags and corresponding comparison outcomes.

The probability terms, $\lambda$, from tag overlap module 352 for the template tags are applied as weights to the attended context vectors for the keywords, ct (represented by a weighted combination of the transformed vectors for the keywords), while complement probability values (e.g., 1−$\lambda$) are applied to the context for the template tags (represented by the encoded template vectors). The weighted contexts for the keywords and template tags are combined by combiners 355, and provided to decoding module 358. When the probability term, $\lambda$, indicates a likely match between a template tag and one of the keyword tags, the attended context of the keywords has greater influence over decoding module 358 for selection of one of the keywords for the template tag (as opposed to another word in the word vocabulary derived from the training data). Moreover, when the probability term, $\lambda$, indicates an unlikely match between a template tag and one of the keyword tags, the context for the template tag has greater influence over decoding module 358 for selection of a vocabulary word for the template tag (as opposed to one of the keywords).

Decoding module 358 constructs a probability distribution over the word vocabulary for each time step (e.g., corresponding to processing a template tag) in the decoding process. In other words, at each time step of the decoding process, an encoded template tag is processed to determine a probability distribution over the word vocabulary that indicates a corresponding word for the template tag. Decoding module 358 employs a machine learning model in the form of a recurrent neural network including a layer of gated recurrent units (GRUs) 359 each producing (e.g., at a corresponding time step) a word for a corresponding template tag based on the combined weighted contexts of the keywords and template tags and a selected word for a prior template tag. A GRU 359 corresponding to an initial template tag in the sequence may utilize a null or dummy word as the prior selected word (e.g., represented by <SOS> as viewed in FIG. 3) since no prior selected words or template tags exist in the sequence. As more template tags are retrieved and processed, GRUs 359 of the decoding module receive and utilize information pertaining to the combined weighted contexts of the keywords and template tags and selected words for prior template tags to select a word for a current template tag.

For each time step (e.g., in a range of 1 to M time steps as viewed in FIG. 3) of the decoding process, the probability distribution, p, over the word vocabulary may be determined by a corresponding GRU 359 and expressed as:

$$p(y_t | y_1, y_2, \ldots, y_{t-1}, m_t) = g(y_{t-1}, s_t, m_t),$$

where $m_t$ is the combined context extracted from the attended context vectors for the keywords and the encoded template tags produced by combiners 355 at time step t; y are the words generated by GRUs 359 of the decoding module at a corresponding time step; $s_t$ is a hidden state of the corresponding GRU 359 of the decoding module at a current time step t; and g is a non-linear activation over a linear function for a corresponding GRU 359 of the decoding module (e.g., an activation function, such as the tanh operation).

The hidden state, $s_t$, for a current GRU 359 of the decoding module may be expressed as:

$$s_t = f(s_{t-1}, y_{t-1}, m_t),$$

where f may be an activation function (e.g., tanh, sigmoid, etc.); $s_{t-1}$ is the hidden state of a prior GRU 359 of the decoding module (or the hidden state at a prior time step); $y_{t-1}$ is the selected word at a prior time step; and $m_t$ is the combined context extracted from the attended context vectors for the keywords and the encoded template tags produced by combiners 355 at a current time step t.

The combined context, $m_t$, represents the context produced by combiners 355 from combining the attended keyword context (represented by the attended context vectors produced from a weighted combination of the transform vectors for the keywords) and the context of the template tags (represented by the encoded template vectors) weighted by the corresponding probability terms, $\lambda$ and 1−$\lambda$, as described above. The combined context, $m_t$, may be expressed as follows:

$$m_t = f(\lambda c_t, 1 - \lambda htt_t),$$

where f is a non-linear activation function similar to g (e.g., a tanh operation); ct are the attended context vectors (represented by the weighted combination of the transformed vectors for the keywords, HK, described above) at a current time step t; $htt_t$ is the encoded template vector for a template tag at a current time step t; and $\lambda$ is the highest matching probability between a template tag and one of the tags of the keywords produced by tag overlap module 352 for a current time step t.

The decoding module 358 may draw attention to, or focus on, certain keywords within the set of keywords 305 when determining a vocabulary word for a template tag. The attended context vectors, ct, may be produced by applying attention weights to the transformed vectors. The attention weights control the contribution of a transformed vector (or keyword) to a corresponding attended context vector to control the attention (or influence) given by decoding module 358 to that keyword. In other words, the attention weights enable decoding module 358 to draw attention to or focus on certain keywords within the set of keywords 305.

Attention mechanism 354 receives the transformed vectors for the keywords from keyword encoder 320 (e.g., represented by HK=[$hk_1$, $hk_2$, $hk_3$, . . . $hk_N$] as viewed in FIG. 3), and generates the weighted combination of transformed vectors for $c_t$. The attention mechanism employs a machine learning model 356 in the form of a feedforward neural network to produce the attention weights. This machine learning model is jointly trained with template encoder 345 and decoding module 358 to produce appropriate attention weights. The attention weights are applied to corresponding transformed vectors for the keywords and summed to produce the attended context vectors (representing the attended context), $c_t$, which may be expressed as follows:

$$c_t = \sum_{j=1}^{N} \alpha_{tj} hk_j,$$

where $\alpha_t$ is the attention weight at time step t; and $hk_j$ is a transformed vector for a keyword.

The attention weight, $\alpha_t$, at a time step t may be expressed as follows:

$a_{tj}=\text{softmax}(a(s_{t-1}, hk_j, htt_t))$, where softmax is the softmax function that receives a vector of real numbers and produces a probability distribution; function, a, is machine learning feed forward network 356 of attention mechanism 354 used for computing the attention weights $\alpha_t$; $s_{t-1}$ is a state of a prior GRU 359 of decoding module 358 (or a state at a prior time step); $hk_j$ is a transformed vector for a keyword; and $htt_t$ is the encoded template vector for a template tag at time step t.

The attention weights, $\alpha_t$, are computed by considering the context for the template tags represented by encoded template vectors, $htt_t$. This ensures that the template tags influence the attention mechanism and selection of natural language content. The decoder provides greater flexibility in extracting contextual information from either the keywords or the template, while ensuring that unnecessary attention is not given to the keywords (unless a current step of generation requires additional attention).

When the tag embedding layers (e.g., tag embedding module 335 for template encoder 345 and decoder 350) are initialized with unique embeddings for each tag, the initial learning process stays stable. The initialization of the tag embedding layers may be accomplished by setting the tag embedding dimension to a tag count within the word vocabulary, and using a one-hot vector for each tag during initialization. The one-hot vector may include one tag with remaining vector elements set to a zero or null value. Although limited similarity across similar tags (e.g., NN and NNS) is initially detected, the embeddings of similar part-of-speech (POS) categories are gradually brought closer as training progresses. This is desirable since universal part-of-speech (POS) categories may be used for the keywords, whereas fine-grained part-of-speech (POS) tags may be used in the template.

Decoding module 358 processes the combined context of the keywords and template tags from combiners 355 and the selected words for previous template tags, and constructs the probability distribution over the word vocabulary in each time step of the decoding process. The vocabulary word associated with the highest probability within the probability distribution for a current GRU 359 (during processing of the sequence of template tags) is selected as the corresponding word, $y_t$, for the current template tag at time step t. Once processing of the sequence of template tags is complete, the set of words indicated by the probability distributions of GRUs 359 forms the resulting natural language content (e.g., sentence, clause, phrase, etc.). The form of the words in the resulting content may be adjusted or modified to align with the forms indicated by the template tags (e.g., plural, possessive, verb conjugation, etc.). The word vocabulary may include additional function words beyond the keywords and/or template tags, where decoding module 358 may select these additional words based on the training. Thus, the length of (or quantity of words) in the generated sequence of words 360 may vary from the length of (or quantity of part-of-speech (POS) tags in) template 315. For example, zero, one, or a plurality of words may be selected from the word vocabulary for a template tag based on the probability distributions when the length of the sequence of words 360 varies from the length of the template.

Moreover, transform module 116 may be implemented with a beam search for decoding module 358 to determine the sequence of words for the template tags. Once the probability distributions from GRUs 359 are determined, a sequence of candidate vocabulary words for an initial template tag and a next template tag are identified from all possible combinations of the vocabulary words indicated by the corresponding probability distributions. A user-specified quantity of sequences of candidate vocabulary words (e.g., width of the beam search) is retained based on a combination of the probabilities for the sequences of candidate vocabulary words (e.g., a user-specified quantity of sequences of candidate vocabulary words with the highest combination of probabilities is retained). This process is repeated by applying the retained sequences of candidate vocabulary words for a template tag to a succeeding template tag until the template tags are processed. A retained sequence of candidate vocabulary words with the highest combined probability after processing the last template tag may serve as the sequence of words for the generated natural language content.

In addition, universal part-of-speech (POS) tags (UPTs) for the keywords and template may be used (instead of language-specific POS tags) to enable transform module 116 to perform template driven multilingual generation. This may be accomplished by using keywords in one natural language as input, and generating natural language content (e.g., sentences, clauses, phrases, etc.) in another natural language by exploiting the UPTs. The transform module operates in substantially the same manner described above, but is trained with sentences from both languages and the universal POS tags. This flexibility is enabled since present invention embodiments are indifferent to syntactic order of the keywords or the underlying natural language.

Figure 4:
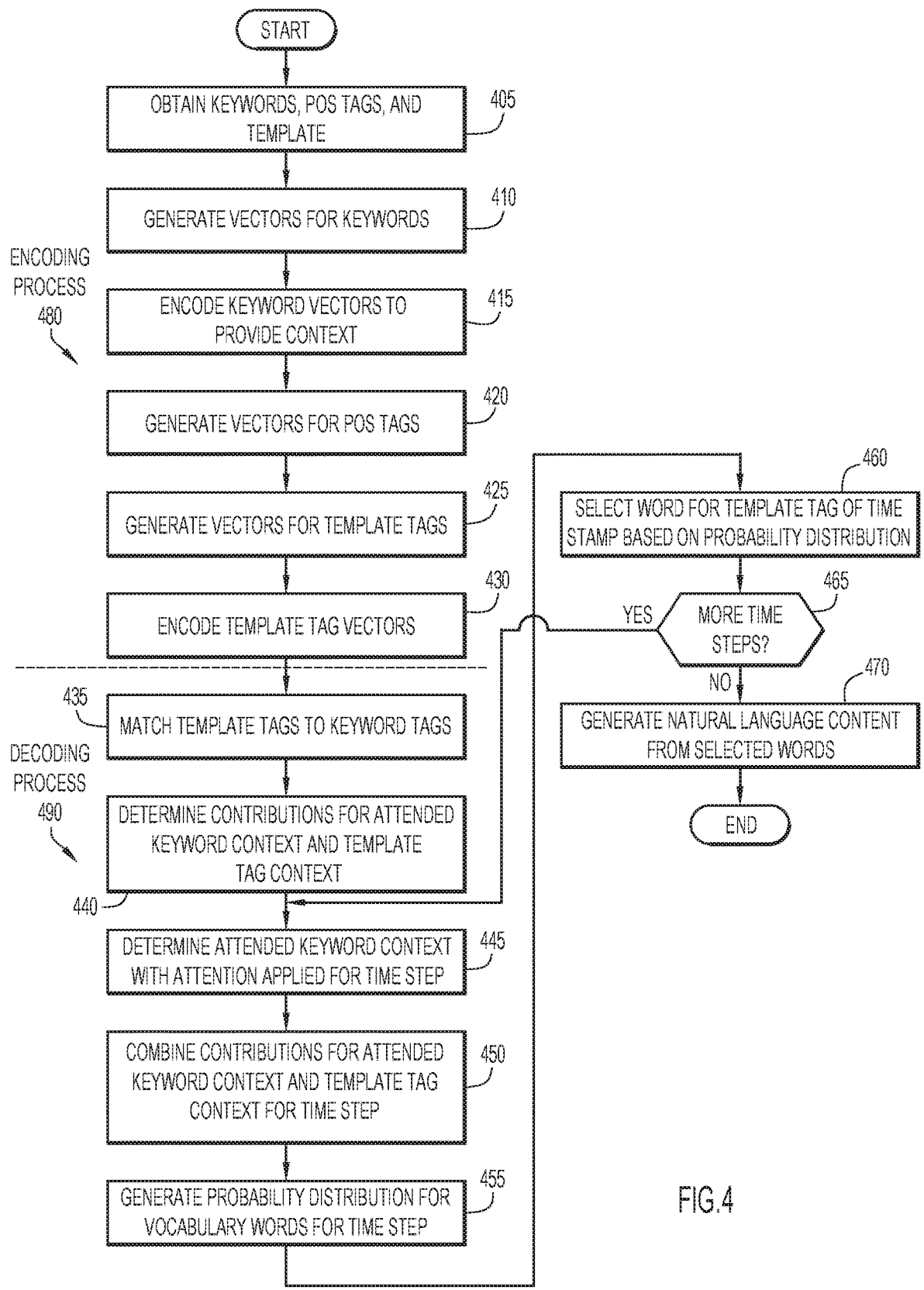
FIG. 4 is a procedural flowchart illustrating a manner of generating natural language content according to an embodiment of the present invention.

A manner of generating natural language content from a set of keywords, a corresponding set of part-of-speech (POS) tags for the keywords, and a template (e.g., via transform module 116 and server system 110 and/or client system 114) according to an embodiment of the present invention is illustrated in FIG. 4. Initially, the generation of natural language content (e.g., sentence, clause, phrase, etc.)

includes an encoding process 480 to encode inputs (e.g., keywords, corresponding part-of-speech (POS) tags, and a template), and a decoding process 490 that processes the encoded inputs to produce words for the template forming the natural language content. Transform module 116 obtains data for performing encoding process 480 including a set of keywords, a set of corresponding part-of-speech (POS) tags for the keywords, and a template including a sequence of part-of-speech (POS) tags at operation 405. The part-of-speech (POS) tags for the keywords may be provided to the transform module, and generated using any conventional natural language processing techniques and/or tools. The POS tags for the keywords may alternatively be generated by the transform module based on the set of keywords using any conventional natural language processing techniques and/or tools. The sequence of POS tags in the template indicates an arrangement for the generated natural language content (e.g., sentence, clause, phrase, etc.). The data obtained by transform module 116 may be received from an application, a system, or a user (e.g., via client system 114).

Keyword encoder 320 (FIG. 3) generates word embeddings or vector representations for each of the keywords at operation 410, and transforms or encodes the word embeddings to produce transformed or encoded vectors for the keywords at operation 415 as described above. The same transformed vector for a keyword is produced regardless of the order of keywords in the set of keywords. The transformed vector for a keyword includes various dimensions indicating context representations for the keyword (similar to the dimensions of the keyword embeddings).

Tag embedding module 335 (FIG. 3) generates tag embeddings or vector representations for each of the part-of-speech (POS) tags for the keywords at operation 420 as described above. The tag embedding module further generates tag embeddings or vector representations for the POS tags of the template at operation 425, while template encoder 345 produces encoded vectors for the template tags at operation 430 representing context of the template tags as described above.

Encoding process 480 produces the transformed vectors for the keywords, embeddings for the corresponding part-of-speech (POS) tags for the keywords, and the encoded vectors for the template tags. These items are processed in decoding process 490 to select one or more words corresponding to a template tag at each time step of the decoding process. In particular, tag overlap module 352 (FIG. 3) receives the tag embeddings for the part-of-speech (POS) tags for the keywords and for the template tags, and determines a likelihood of matches between the keyword tags and template tags at operation 435 as described above. The contributions for an attended keyword context and template tag context with respect to decoder 350 selecting a vocabulary word for a template tag are determined at operation 440 based on the tag matching as described above. The tag overlap module determines the importance (or context weights) for combining the attended context for the keywords (represented by attended context vectors produced from a weighted combination of the transformed vectors) and context for the template tags (represented by the encoded template vectors). The importance (or context weights) control an amount of contribution from (or influence of) the attended context of the keywords and the context of the template tags for selecting words for the resulting natural language content. The importance or context weight is provided in the form of a probability term indicating the highest matching probability between a current tag in the template and one of the tags related to the keywords.

The attended context for the keywords at a current time step of the decoding process is produced at operation 445. The attended context for the keywords is represented by attended context vectors derived from a weighted combination of the transformed vectors for the keywords. The weighted combination of the transformed vectors for the keywords may be produced by applying attention weights to the transformed vectors. The attention weights control the contribution of a transformed vector (or keyword) to the corresponding attended context vector to draw attention to, or focus, the decoder on certain keywords. Attention mechanism 354 (FIG. 3) determines the attention weights for a current time step of the decoding process, and applies the attention weights to the transformed vectors to produce the attended context vectors based on the weighted combination of transformed vectors for the keywords as described above.

The contributions from the attended context for the keywords and the context of a template tag at the current time step of the decoding process are combined at operation 450. This may be accomplished by applying the probability terms from tag overlap module 352 for the template tags as weights to the attended context vectors for the keywords (represented by the weighted combination of the transformed vectors for the keywords at the current time step), while complement probability values (e.g., $1-\lambda$) are applied to the context for the template tag of the current time step (represented by the encoded template vectors) to implement the appropriate contributions for decoder 350 as described above. The contributions of the attended context for the keywords and context for the template tag are combined by a corresponding combiner 355 (FIG. 3) and provided to decoding module 358.

Decoding module 358 (FIG. 3) processes the contributions of the attended context for the keywords and context for the template tag, and constructs a probability distribution over a word vocabulary (derived from training data) at operation 455 as described above. The probability distribution indicates probabilities of corresponding words in the vocabulary being a correct selection for the template tag of the current time step. One or more vocabulary words are selected for the template tag of the current time step at operation 460. For example, one or more vocabulary words associated with the highest probabilities within the probability distribution for a current template tag may be selected as the corresponding words.

When additional time steps (or template tags) are present as determined at operation 465, the above process is repeated (from operation 445) for the additional time steps (or template tags).

Once processing of the sequence of template tags is complete, the resulting natural language content (e.g., sentence, clause, phrase, etc.) is generated from the selected words at operation 470. The form of the words in the resulting content may be adjusted or modified to align with the forms indicated by the template tags (e.g., plural, possessive, verb conjugation, etc.). The word vocabulary may include additional function words outside the keywords and/or template tags, where the transform module may select these additional words based on the training. Thus, the length of (or quantity of words) in the generated natural language content may vary from the length of (or quantity of) part-of-speech (POS) tags in) the template. For example, zero, one, or a plurality of words may be selected from the word vocabulary for a template tag based on the probability distributions when the length of the generated natural language content varies from the length of the template.

Moreover, a beam search may be implemented for decoding module 358 to determine the sequence of words for the template tags as described above. The width of the beam search may be of any desired values, but is preferably within the range of two to twenty. Once the probability distributions of vocabulary words for the template tags are determined, a sequence of candidate vocabulary words for an initial template tag and a next template tag are identified from all possible combinations of the vocabulary words indicated by the corresponding probability distributions. A quantity of sequences of candidate vocabulary words (e.g., width of the beam search) is retained based on a combination of the probabilities for the sequences of candidate vocabulary words. This process is repeated by applying the retained sequences of candidate vocabulary words for a template tag to a succeeding template tag until the template tags are processed. A retained sequence of candidate vocabulary words with the highest combined probability after processing the last template tag may serve as the sequence of words for the generated natural language content.

In addition, universal part-of-speech (POS) tags (UPTs) for the keywords and template may be used (instead of language-specific POS tags) to enable transform module 116 to perform template driven multilingual generation as described above. This may be accomplished by using keywords in one natural language as input, and generating natural language content (e.g., sentences, clauses, phrases, etc.) in another natural language by exploiting the UPTs. The transform module operates in substantially the same manner described above, but is trained with sentences from both languages and the universal POS tags.

Figure 5:
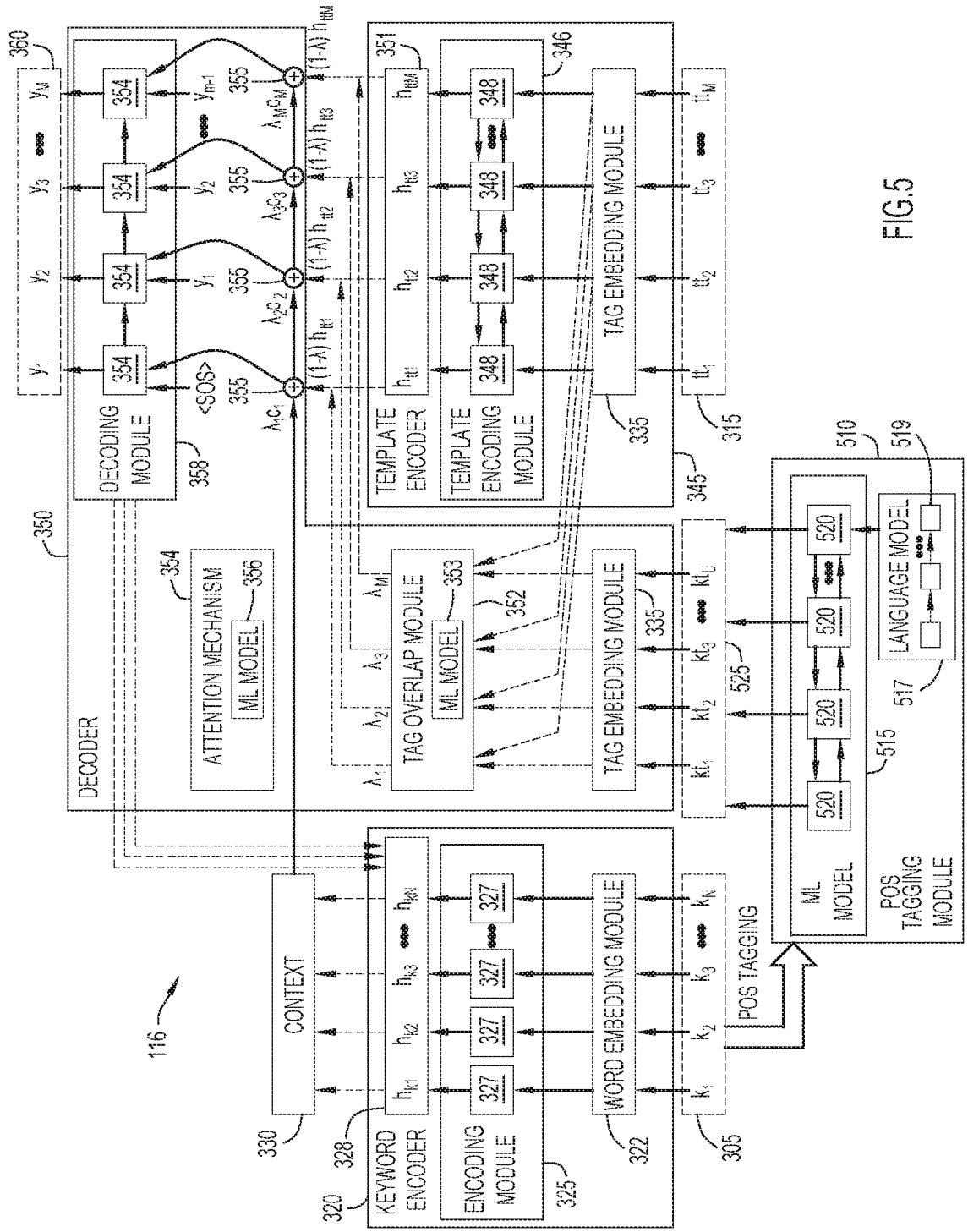
FIG. 5 is a block diagram illustrating an alternative flow of the transform module of FIG. 1 for generating natural language content using context oblivious part-of speech (POS) tagging of keywords according to an embodiment of the present invention.

An alternative embodiment of the present invention for generating natural language content using context oblivious part-of speech (POS) tagging of keywords is illustrated in FIG. 5. Initially, transform module 116 is substantially similar to the transform module described above (e.g., FIGS. 1, 3, and 4), except that the part-of-speech (POS) tags 310 for the set of keywords 305 are determined using a context oblivious approach.

Part-of-speech (POS) tagging determines a corresponding part-of-speech (POS) (e.g., noun, verb, etc.) for a word in a corpus of text based on both a definition and context of the word. The context may include a relationship of the word with adjacent and related words in a phrase, sentence, or paragraph. Conventional approaches include a unigram tagger that provides a word with a POS tag based solely on the frequency of the tag given a word. Other approaches may use resources or dictionaries that already contain likely POS tags for a word.

Transform module 116 may include a POS tagging module 510 that receives the set of keywords 305 (e.g., represented by K=[k1, k2, k3, . . . kN] as viewed in FIG. 5), and produces corresponding part-of-speech (POS) tags for the keywords 525 (e.g., represented by KT=[kt1, kt2, kt3, . . . ktU] as viewed in FIG. 5) using a context oblivious approach (e.g., without using context to determine the POS tags).

POS tagging module 510 employs a machine learning model 515 to receive the set of keywords and produce the corresponding part-of-speech (POS) tags. The machine learning model may include various machine learning models (e.g., bidirectional sequential machine learning models where a signal propagates backward as well as forward in time, such as recurrent neural networks, a forward-backward algorithm for Hidden Markov Models (HMM) and conditional random fields (CRF), etc.). For example, machine learning model 515 may include a bidirectional recurrent neural network including a layer of bidirectional long short-term memory (LSTM) units 520. The bidirectional recurrent neural network includes a recurrent neural network for each direction (e.g., a forward direction from preceding to succeeding LSTM units and a backward direction from succeeding to preceding LSTM units). The forward direction recurrent neural network retrieves and processes the keywords in the order presented, and generates the hidden states for the LSTM units in this direction at successive time steps (e.g., each time step corresponds to a LSTM unit 520 processing a corresponding keyword in the presented sequence).

The hidden state for an LSTM unit 520 in the forward direction may be expressed as:

$$s_t \text{ forward} = f(s_{t-1}, POS_{t-1}, k_t),$$

where f may be an activation function (e.g., tanh, sigmoid, etc.); $s_{t-1}$ is the hidden state of a prior LSTM unit 520 in the forward direction (or the hidden state at a prior time step in the forward direction); $POS_{t-1}$ is a part-of-speech (POS) tag for a keyword produced in the forward direction at a prior time step; and $k_t$ is a keyword at a current time step t in the forward direction.

The backward direction recurrent neural network retrieves and processes the keywords in the opposing order, and generates the hidden states for the LSTM units in this direction at successive time steps (e.g., each time step corresponds to a LSTM unit 520 processing a corresponding keyword in the opposing sequence).

The hidden state for a LSTM unit 520 in the backward direction may be expressed as:

$$s_t \text{ backward} = f(s_{t-1}, POS_{t-1}, k_t),$$

where f may be an activation function (e.g., tanh, sigmoid, etc.); $s_{t-1}$ is the hidden state of a prior LSTM unit in the reverse direction (or the hidden state at a prior time step in the backward direction); $POS_{t-1}$ is a part-of-speech (POS) tag for a keyword produced in the backward direction at a prior time step; and $k_t$ is a keyword at a current time step t in the backward direction.

As more keywords are retrieved and processed, the LSTM units processing the succeeding keywords receive and utilize information pertaining to adjacent keywords (in the particular direction) to produce the part-of-speech (POS) tags. The machine learning model learns POS tags from training over a corpus of words and corresponding POS tags. Once the keywords are processed, each LSTM unit 520 (e.g., corresponding to a time step in each direction) constructs a probability distribution over the learned POS tags for a corresponding keyword based on information for adjacent keywords and prior selected POS tags in each direction. The POS tag associated with the highest probability within the probability distribution for a LSTM unit may be selected as the POS tag for the corresponding keyword. Alternatively, a beam search of any desired user-specified width may be performed over the output space in substantially the same manner described above to determine the POS tags for the keywords.

POS tagging module 510 may further include a language model 517 to order the keywords for processing by machine learning model 515. The language model may be any conventional or other model for natural languages. For example, a conventional language model may employ a recurrent neural network including a series of long short-term memory (LSTM) units 519. The state of a LSTM unit 519 may be expressed as:

$$h_i = \delta(w_i, h_{i-1}),$$

where $\delta$ is an LSTM unit update function; $h_i$ is a current state of an LSTM unit 519; $w_i$ is a current word; and $h_{i-1}$ is a state of a prior LSTM unit 519 (or a state at a prior time step).

The language model may be queried to provide an estimate of a probability for a next word, $p(w_i|w_1, \ldots w_{i-1})$, based on previous words and a prior state of a hidden layer, which may be expressed as:

$$q(w_i, h_{i-1}) = p(w_i | w_1, \ldots w_{i-1}).$$

where $h_{i-1}$ is a state of a prior LSTM unit 519 (or a state at a prior time step); $w_i$ is a current word; and q is a softmax function (with weights and a bias (e.g., derived from training) applied to the prior state).

Phrase probabilities are determined on a per word basis (e.g., summation of a log of probabilities of individual words relative to prior words) as the keywords traverse the LSTM units, and are used to select a next word in the order. An example of this type of language model is disclosed in Schmaltz et al., "Word Ordering Without Syntax", Proceedings of the 2016 Conference on Empirical Methods in Natural Language Processing", pages 2319-2324, Austin, Tex., Nov. 1-5, 2016.

Transform module 116 may receive the set of keywords 305 and template 315 containing a sequence of part-of-speech (POS) tags indicating an arrangement for the generated natural language content (e.g., sentence, clause, phrase, etc.). POS tagging module 510 determines the corresponding POS tags for the set of keywords using the context oblivious approach described above. The set of keywords 305, POS tags for the keywords determined by POS tagging module 510, and template 315 are processed in substantially the same manner described above (e.g., for FIGS. 3 and 4) to generate natural language content (e.g., sentence, clause, phrase, etc.) for the set of keywords in accordance with the arrangement indicated by the template. In other words, the POS tags for the keywords determined by POS tagging module 510 are utilized by transform module 116 to generate the natural language content in place of the POS tags for the keywords generated by conventional natural language processing (NLP) techniques described above.

Figure 6:
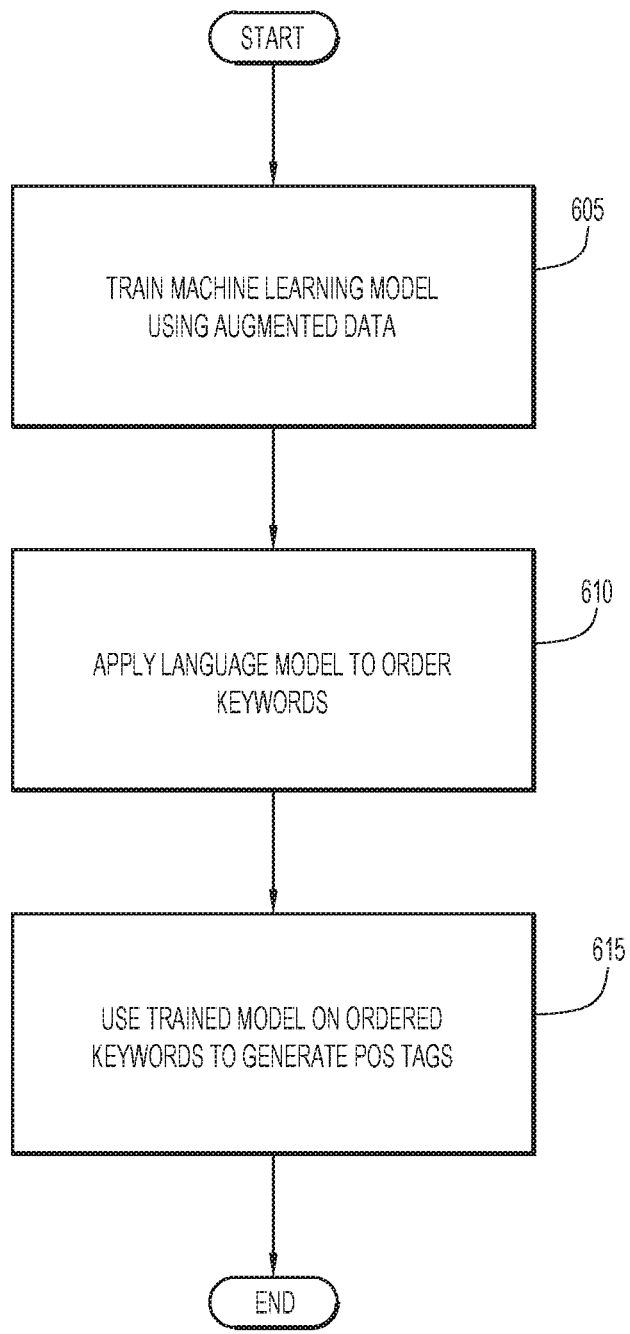
FIG. 6 is a procedural flowchart illustrating a manner of tagging keywords with part-of-speech (POS) tags using a context oblivious approach according to an embodiment of the present invention.

A manner of tagging keywords with part-speech (POS) tags using a context oblivious approach (e.g., via POS tagging module 510 and server system 110 and/or client system 114) according to an embodiment of the present invention is illustrated in FIG. 6. Initially, machine learning model 515 (FIG. 5) is trained using augmented data at operation 605. Augmented data includes examples of complete sentences and the sentences without function or stop words. Part-of-speech (POS) tags for function or stop words are fixed and do not depend on context.

For example, FIG. 7 illustrates a table 705 of augmented data for training machine learning model 515. A table column includes sentences without function or stop words (e.g., "comical morning"), and another table column includes the corresponding complete sentences (e.g., "there was something comical in the morning"). Similarly, a table 710 includes part-of-speech (POS) tags for the sentences without function or stop words (e.g., JJ NN for "comical morning"), and another table column includes POS tags for the corresponding complete sentence (e.g., EX VB NN JJ IN DT NN for "there was something comical in the morning").

F1 scores were computed for keyword based training data and augmented keyword based training data for training and validation phases. An F1 score considers both precision and recall. The F1 scores for training and validation phases for the augmented keyword based training data indicated an improvement relative to the keyword based training data.

Referring back to FIG. 6, language model 517 (FIG. 5) is utilized to order the keywords at operation 610. The ordered keywords are applied to the trained machine learning model at operation 615 to generate the part-of-speech (POS) tags for the keywords.

Results produced by present invention embodiments have been compared to other systems. FIG. 8 illustrates performance of present invention embodiments (e.g., indicated as TEMPLATE (without a beam search) and TEMPLATE BEAM (with a beam search with a beam width of five over the output space)) with respect to various natural language generation (NLG) metrics (e.g., Bilingual Evaluation Understudy (BLEU), Metric for Evaluation for Translation with Explicit Ordering (METEOR), Recall Oriented Understudy for Gisting Evaluation (ROUGE-L), Skip-thought sentence similarity metric (SkipT), and an averaged POS overlap (POSMatch). The dataset used for producing the metrics contained an input sentence and an exemplar sentence. This provides two different evaluations referred to as exact and similar (e.g., as viewed in FIG. 8). The exact evaluation considers part-of-speech (POS) tag sequences of the expected output as the template, while the similar evaluation considers POS tags of the exemplar sentence as the template.

The systems within FIG. 8 for comparison with present invention embodiments include:

TRANSNOTEMPLATE which refers to a transformer based encoder-decoder framework that only accepts keywords as input and not any template (an example of this type of system is disclosed in Vaswani et al., "Attention Is All You Need", Advances in Neural Information Processing Systems, pages 5998-6008, 2017);

RNNNOTEMPLATE which refers to a long short-term memory (LSTM) based encoder-decoder framework that only accepts keywords as input and not any template (an example of this type of system is disclosed in Bandanau et al., "Neural Machine Translation by Jointly Learning to Align and Translate", Proceedings of the $3^{rd}$ International Conference on Learning Representations, ICLR 2015, San Diego, Calif., USA, May 7-9, 2015, Conference Track Proceedings);

TRANSCONCAT which refers to a transformer based framework (e.g., TRANSNOTEMPLATE) with keywords and templates concatenated and given as the input;

RNNCONCAT which refers to a long short-term memory (LSTM) based framework (e.g., RNNNOTEMPLATE) with keywords and templates concatenated and given as the input; and SENTEXEMP which refers to system that expects input and exemplar sentences (an example of this type of system is disclosed in Chen et al., "Controllable Paraphrase Generation with a Syntactic Exemplar", Proceedings of the 57th Annual Meeting of the Association for Computational Linguistics, pages 5972-5984, Florence, Italy, 2019).

Performance indices for the NOTEMPLATE models (e.g., TRANSNOTEMPLATE and RNNNOTEMPLATE) indicate that without external knowledge about the syntax and style, the sequence-to-sequence models have difficulty producing fluent and adequate sentences from keywords. The CONCAT models (e.g., TRANSCONCAT and RNNCONCAT) perform well when keywords are presented in the same order in which their variations appear in the output, but perform poorly when such ordering is not preserved. SENTEXEMP is order agnostic but the metrics indicate that this system is clearly not designed for keyword to text generation.

Present invention embodiments (e.g., TEMPLATE and TEMPLATEBEAM) are stable, provide solid performance, and are insensitive to change in keyword order.

FIG. 9 illustrates example inputs and outputs from an embodiment of the present invention employing a beam search and a portion of the systems for comparison in FIG. 8. The systems for comparison with the present invention embodiment include SENTEXEMP, RNNCONCAT and TRANSCONCAT. The examples of FIG. 9 focus on different linguistic and practical aspects (e.g., variation in syntax and style, change in input keyword order, spurious keywords should not appear in the output, etc.). Present invention embodiments handle templates of various sentence forms, such as declarative, interrogative, exclamatory and negation. In addition, the later examples of FIG. 9 providing varying keyword order illustrate an aspect of the present invention embodiment towards ignoring spurious entries (e.g., the adjective "great", etc.) relative to the other systems.

It will be appreciated that the embodiments described above and illustrated in the drawings represent only a few of the many ways of implementing embodiments for natural language text generation from a set of keywords using machine learning and templates.

The computing environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, transform module 116, interface module 120, etc.). These systems may include any types of monitors and input devices (e.g., keyboard, mouse, voice recognition, etc.) to enter and/or view information.

It is to be understood that the software (e.g., transform module 116, interface module 120, keyword encoder 320, word embedding module 322, encoding module 325, tag embedding module 335, template encoder 345, template encoding module 346, decoder 350, tag overlap module 352, attention mechanism 354, combiners 355, decoding module 358, POS tagging module 510, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., transform module 116, interface module 120, keyword encoder 320, word embedding module 322, encoding module 325, tag embedding module 335, template encoder 345, template encoding module 346, decoder 350, tag overlap module 352, attention mechanism 354, combiners 355, decoding module 358, POS tagging module 510, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store any information (e.g., training data, vocabulary, machine learning or other parameters, dictionaries, etc.). The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The report may include any information arranged in any fashion, and may be configurable based on rules or other criteria to provide desired information to a user (e.g., generated natural language content, metrics pertaining to the analysis, etc.).

The present invention embodiments are not limited to the specific tasks or algorithms described above, but may be utilized for generating natural language content (e.g., complete or partial sentences, clauses, phrases, word sets, etc.) from any quantity of keywords in accordance with a template or other specification for any natural languages (e.g., English, French, German, Spanish, Japanese, etc.).

The generated content may include any portion of constructs of a natural language (e.g., complete or partial sentences, clauses, phrases, word sets, etc.). The set of keywords may include any quantity of any tokens (e.g., words, acronyms, abbreviations, etc.) of any length from any natural language, and may be arranged in any desired order. The template may include any quantity of any types of tags arranged in any desired order indicating an arrangement of the tokens for the generated content. The tags for the keywords and templates may include any tags or other indicators providing a language or other characteristic of the keywords (e.g., language specific or universal tags, part-of-speech (POS), etc.). The keywords and generated natural language content may correspond to the same or different natural languages (e.g., where different natural languages provide a translation). The natural languages may be any desired natural or spoken languages (e.g., English, French, German, Spanish, Japanese, etc.). The keyword, tags, and generated natural language content may be in any desired form (e.g., text, characters, extracted from images or video using optical character recognition or other techniques, extracted from any documents using natural language processing (NLP) or other techniques, extracted from audio files, etc.).

The various machine learning models of present invention embodiments (e.g., for word/tag embedding, encoding of keyword embeddings, tag matching, encoding of template tag embeddings, generating attention weights, decoding, POS tagging, providing language models, etc.) may include any type of machine learning models (e.g., feed-forward, recurrent, or other neural networks, classifiers, etc.). The machine learning models may include any quantity of any type of units (e.g., GRUs, LSTMs, neural layers, etc.) to accommodate a corresponding quantity of inputs (e.g., keywords, tags, vectors, embeddings, etc.), and may be configured for forward and/or forward and backward propagation. The machine learning models may be jointly and/or individually trained to determine parameters (e.g., weights, bias, etc.) based on any desired training data (e.g., tags, sentences, keyword sets, comparison results, phrases, clauses, individual words, etc.). The word or other vocabulary may be derived or learned through training of any individual one, or combination, of the machine learning models based on any training data (e.g., sentences, tags, phrases, clauses, individual words, etc.). The word or other vocabulary may include any types of words or other tokens (e.g., function words, keywords, acronyms, abbreviations, symbol, etc.).

The various vectors for keywords, keyword tags, and template tags (e.g., embeddings, transformed vectors, encoded template vectors, attended context vectors, etc.) may include any quantity of elements or features of any values to indicate a context or meaning for the corresponding item (e.g., keyword, tag, set of keywords, etc.).

The probability (e.g., likelihood of matching a template tag to a keyword tag) may be expressed in any manner (e.g., value ranges, percentages, etc.) indicating a probability in a range of 0% to 100%. The similarity may be measured using any desired similarity or distance measure (e.g., cosine similarity, Euclidean distance, etc.). The attention weights may be any suitable values (e.g., indicating a probability in the range of 0% to 100%, etc.) to adjust contributions of the keywords to the attended context. The context oblivious POS tagging may use any conventional or other language models to order the keywords.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of generating natural language content from a set of keywords in accordance with a template comprising:
    generating, via a processor, word embeddings for the keywords;
    generating, via the processor, keyword vectors representing a context for the keywords based on the word embeddings for the keywords, wherein the keywords are syntactically unordered and associated with language tags, and wherein the template includes a series of language tags indicating an arrangement for words of the generated natural language content;
    generating, via the processor, word embeddings for the series of language tags of the template;
    generating, via the processor, template vectors based on the word embeddings for the series of language tags of the template, wherein the template vectors represent a context for the template;
    generating, via the processor, word embeddings for the associated language tags of the keywords;
    determining, via the processor, contributions from the context for the keywords represented by the keyword vectors and the context for the template represented by the template vectors based on a comparison of the word embeddings of the series of language tags of the template with the word embeddings of the associated language tags of the keywords; and
    generating, via a machine learning model of the processor, one or more words for each language tag of the template from a word vocabulary to produce the natural language content based on combined contributions from the context for the keywords represented by the keyword vectors and the context for the template represented by the template vectors, wherein the machine learning model includes a recurrent neural network and the word vocabulary is learned from training data during training of the machine learning model.

2. The method of claim 1, wherein the language tags of the template and the associated language tags of the keywords include part-of-speech tags.

3. The method of claim 1, wherein determining contributions comprises:
   determining a probability for each language tag of the template indicating a likelihood of that language tag of the template matching one of the associated language tags of the keywords, wherein the probability for a corresponding language tag of the template indicates the contribution for the context of the keywords for generating a word for the corresponding language tag of the template, and wherein a complement of the probability indicates the contribution for the context of the template for generating the word for the corresponding language tag of the template.

4. The method of claim 3, further comprising:
   applying the probability for the corresponding language tag of the template to a keyword vector associated with the corresponding language tag of the template to produce the contribution of the context for the keywords;
   applying the complement of the probability for the corresponding language tag of the template to a template vector associated with the corresponding language tag of the template to produce the contribution of the context for the template; and
   combining the contributions of the contexts for the keywords and the template to produce the combined contributions.

5. The method of claim 1, further comprising:
   determining the associated language tags for the keywords via a second machine learning model, wherein the second machine learning model is trained with a data set including complete sentences and the complete sentences without function words.

6. The method of claim 1, wherein the keywords are in a first natural language, and the generated natural language content is in a second different natural language.

7. The method of claim 1, wherein generating the keyword vectors comprises:
   encoding the word embeddings for the keywords using a second machine learning model to produce encoded vector representations of the keywords, wherein the second machine learning model is trained to produce the same encoded vector representations for a corresponding set of keywords regardless of an order of keywords in the corresponding set; and
   generating the keyword vectors based on the encoded vector representations.

8. The method of claim 7, wherein generating the keyword vectors based on the encoded vector representations further comprises:
   applying attention weights to the encoded vector representations of the keywords to produce a keyword vector for a corresponding language tag of the template as a weighted combination of the encoded vector representations, wherein the attention weights indicate importance of individual keywords and are based on the corresponding language tag of the template.

9. The method of claim 1, wherein generating the template vectors comprises:
   encoding the word embeddings for the series of language tags of the template using a bidirectional recurrent machine learning model; and
   producing the template vectors based on the encoded word embeddings for the series of language tags of the template, wherein each template vector is produced based on adjacent language tags within the template.

10. The method of claim 1, wherein generating one or more words for each language tag of the template comprises:
    determining for each language tag of the template a probability distribution over the word vocabulary using the machine learning model; and
    selecting one or more words from the word vocabulary for a corresponding language tag of the template based on the probability distribution.

11. A system for generating natural language content from a set of keywords in accordance with a template comprising:
    a processor configured to:
      generate word embeddings for the keywords;
      generate keyword vectors representing a context for the keywords based on the word embeddings for the keywords, wherein the keywords are syntactically unordered and associated with language tags, and wherein the template includes a series of language tags indicating an arrangement for words of the generated natural language content;
      generate word embeddings for the series of language tags of the template;
      generate template vectors based on the word embeddings for the series of language tags of the template, wherein the template vectors represent a context for the template;
      generate word embeddings for the associated language tags of the keywords;
      determine contributions from the context for the keywords represented by the keyword vectors and the context for the template represented by the template vectors based on a comparison of the word embeddings of the series of language tags of the template with the word embeddings of the associated language tags of the keywords; and
      generate, via a machine learning model, one or more words for each language tag of the template from a word vocabulary to produce the natural language content based on combined contributions from the context for the keywords represented by the keyword vectors and the context for the template represented by the template vectors, wherein the machine learning model includes a recurrent neural network and the word vocabulary is learned from training data during training of the machine learning model.

12. The system of claim 11, wherein determining contributions comprises:
    determining a probability for each language tag of the template indicating a likelihood of that language tag of the template matching one of the associated language tags of the keywords, wherein the probability for a corresponding language tag of the template indicates the contribution for the context of the keywords for generating a word for the corresponding language tag of the template, and wherein a complement of the probability indicates the contribution for the context of the template for generating the word for the corresponding language tag of the template.

13. The system of claim 11, wherein the processor is further configured to:
    determine the associated language tags for the keywords via a second machine learning model, wherein the second machine learning model is trained with a data set including complete sentences and the complete sentences without function words.

14. The system of claim 11, wherein generating the keyword vectors comprises:

encoding the word embeddings for the keywords using a second machine learning model to produce encoded vector representations of the keywords, wherein the second machine learning model is trained to produce the same encoded vector representations for a corresponding set of keywords regardless of an order of keywords in the corresponding set; and generating the keyword vectors based on the encoded vector representations, wherein generating the keyword vectors based on the encoded vector representations further comprises:

applying attention weights to the encoded vector representations of the keywords to produce a keyword vector for a corresponding language tag of the template as a weighted combination of the encoded vector representations, wherein the attention weights indicate importance of individual keywords and are based on the corresponding language tag of the template; and wherein generating the template vectors comprises:

encoding the word embeddings for the series of language tags of the template using a bidirectional recurrent machine learning model; and producing the template vectors based on the encoded word embeddings for the series of language tags of the template, wherein each template vector is produced based on adjacent language tags within the template.

15. The system of claim 11, wherein generating one or more words for each language tag of the template comprises:

determining for each language tag of the template a probability distribution over the word vocabulary using the machine learning model; and selecting one or more words from the word vocabulary for a corresponding language tag of the template based on the probability distribution.

16. A computer program product for generating natural language content from a set of keywords in accordance with a template, the computer program product comprising one or more computer readable storage media having program instructions collectively stored on the one or more computer readable storage media, the program instructions executable by a processor to cause the processor to:

generate word embeddings for the keywords;

generate keyword vectors representing a context for the keywords based on the word embeddings for the keywords, wherein the keywords are syntactically unordered and associated with language tags, and wherein the template includes a series of language tags indicating an arrangement for words of the generated natural language content;

generate word embeddings for the series of language tags of the template;

generate template vectors based on the word embeddings for the series of language tags of the template, wherein the template vectors represent a context for the template;

generate word embeddings for the associated language tags of the keywords;

determine contributions from the context for the keywords represented by the keyword vectors and the context for the template represented by the template vectors based on a comparison of the word embeddings of the series of language tags of the template with the word embeddings of the associated language tags of the keywords; and generate, via a machine learning model, one or more words for each language tag of the template from a word vocabulary to produce the natural language content based on combined contributions from the context for the keywords represented by the keyword vectors and the context for the template represented by the template vectors, wherein the machine learning model includes a recurrent neural network and the word vocabulary is learned from training data during training of the machine learning model.

17. The computer program product of claim 16, wherein determining contributions comprises:

determining a probability for each language tag of the template indicating a likelihood of that language tag of the template matching one of the associated language tags of the keywords, wherein the probability for a corresponding language tag of the template indicates the contribution for the context of the keywords for generating a word for the corresponding language tag of the template, and wherein a complement of the probability indicates the contribution for the context of the template for generating the word for the corresponding language tag of the template.

18. The computer program product of claim 16, wherein the program instructions further cause the processor to:

determine the associated language tags for the keywords via a second machine learning model, wherein the second machine learning model is trained with a data set including complete sentences and the complete sentences without function words.

19. The computer program product of claim 16, wherein generating the keyword vectors comprises:

encoding the word embeddings for the keywords using a second machine learning model to produce encoded vector representations of the keywords, wherein the second machine learning model is trained to produce the same encoded vector representations for a corresponding set of keywords regardless of an order of keywords in the corresponding set; and generating the keyword vectors based on the encoded vector representations, wherein generating the keyword vectors based on the encoded vector representations further comprises:

applying attention weights to the encoded vector representations of the keywords to produce a keyword vector for a corresponding language tag of the template as a weighted combination of the encoded vector representations, wherein the attention weights indicate importance of individual keywords and are based on the corresponding language tag of the template; and wherein generating the template vectors comprises:

encoding the word embeddings for the series of language tags of the template using a bidirectional recurrent machine learning model; and producing the template vectors based on the encoded word embeddings for the series of language tags of the template, wherein each template vector is produced based on adjacent language tags within the template.

20. The computer program product of claim 16, wherein generating one or more words for each language tag of the template comprises:

determining for each language tag of the template a probability distribution over the word vocabulary using the machine learning model; and selecting one or more words from the word vocabulary for a corresponding language tag of the template based on the probability distribution.

\* \* \* \* \*